United States Patent
Kotake

(10) Patent No.: US 11,975,414 B2
(45) Date of Patent: May 7, 2024

(54) TOOL REST AND MACHINE TOOL

(71) Applicants: CITIZEN WATCH CO., LTD., Tokyo (JP); CITIZEN MACHINERY CO., LTD., Nagano (JP)

(72) Inventor: Kyota Kotake, Saitama (JP)

(73) Assignees: CITIZEN WATCH CO., LTD., Tokyo (JP); CITIZEN MACHINERY CO., LTD., Nagano (JP)

( * ) Notice: Subject to any disclaimer, the term of this patent is extended or adjusted under 35 U.S.C. 154(b) by 536 days.

(21) Appl. No.: 17/262,722

(22) PCT Filed: Aug. 21, 2019

(86) PCT No.: PCT/JP2019/032675
§ 371 (c)(1),
(2) Date: Jan. 24, 2021

(87) PCT Pub. No.: WO2020/040211
PCT Pub. Date: Feb. 27, 2020

(65) Prior Publication Data
US 2021/0308774 A1    Oct. 7, 2021

Related U.S. Application Data

(60) Provisional application No. 62/722,094, filed on Aug. 23, 2018.

(51) Int. Cl.
*B23B 29/24* (2006.01)
*B23B 31/26* (2006.01)
*B23Q 1/00* (2006.01)

(52) U.S. Cl.
CPC ............ *B23Q 1/0009* (2013.01); *B23B 29/24* (2013.01); *B23B 31/265* (2013.01); *Y10T 408/89* (2015.01); *Y10T 409/309464* (2015.01)

(58) Field of Classification Search
CPC ..... B23B 31/261; B23B 31/265; B23B 29/24; B23B 29/244; B23B 29/246;
(Continued)

(56) References Cited

U.S. PATENT DOCUMENTS

| 3,949,778 | A | * | 4/1976 | Woodford | ............... F16L 3/015 |
| | | | | | 137/355.16 |
| 2008/0066591 | A1 | * | 3/2008 | Yamane | ............... B23Q 1/0009 |
| | | | | | 29/27 R |
| 2020/0001416 | A1 | * | 1/2020 | Sugiura | ............. B23Q 3/15526 |

FOREIGN PATENT DOCUMENTS

| CN | 104289957 A | | 1/2015 | |
| IT | 1217016 B | * | 3/1990 | ............. B08B 15/00 |

(Continued)

OTHER PUBLICATIONS

WIPO, International Search Report for PCT/JP2019/032675, dated Nov. 19, 2019.

(Continued)

*Primary Examiner* — Sunil K Singh
*Assistant Examiner* — Michael Vitale

(57) ABSTRACT

A tool rest has a base, a tool holder rotatably supported on the base, and rotatably holding a tool, a rotational mechanism rotating the tool holder, a plurality of flexible linear members in which one ends of the plurality of linear members are connected with the tool holder and a winding device connected with the other ends of the plurality of linear members, and winding up the plurality of linear members by rotating when the tool holder is rotated by the rotational mechanism.

5 Claims, 33 Drawing Sheets

(58) Field of Classification Search
CPC .. B23Q 1/0009; B23Q 1/0018; B23Q 1/0036; Y10T 408/89; Y10T 409/309408; Y10T 409/309464; Y10T 409/309352
USPC ............ 409/232, 233, 231; 408/199; 40/199
See application file for complete search history.

(56) References Cited

FOREIGN PATENT DOCUMENTS

| | | | |
|---|---|---|---|
| JP | S63-071081 A | 3/1988 | |
| JP | 2010-162646 A | 7/2010 | |
| JP | 2019146386 A * | 8/2019 | |
| JP | 6759045 B2 * | 9/2020 | |
| SU | 1465240 A * | 3/1989 | ........... B23Q 1/0009 |
| WO | 2009/036785 A1 | 3/2009 | |

OTHER PUBLICATIONS

WIPO, Written Opinion for PCT/JP2019/032675, dated Nov. 19, 2019.
The State Intellectual Property Office of People's Republic of China, Chinese Office Action for Chinese Patent Application No. 201980054767.3, dated Apr. 6, 2022 (A Machine translation of the Office Action is attached hereto).

* cited by examiner

F I G. 1
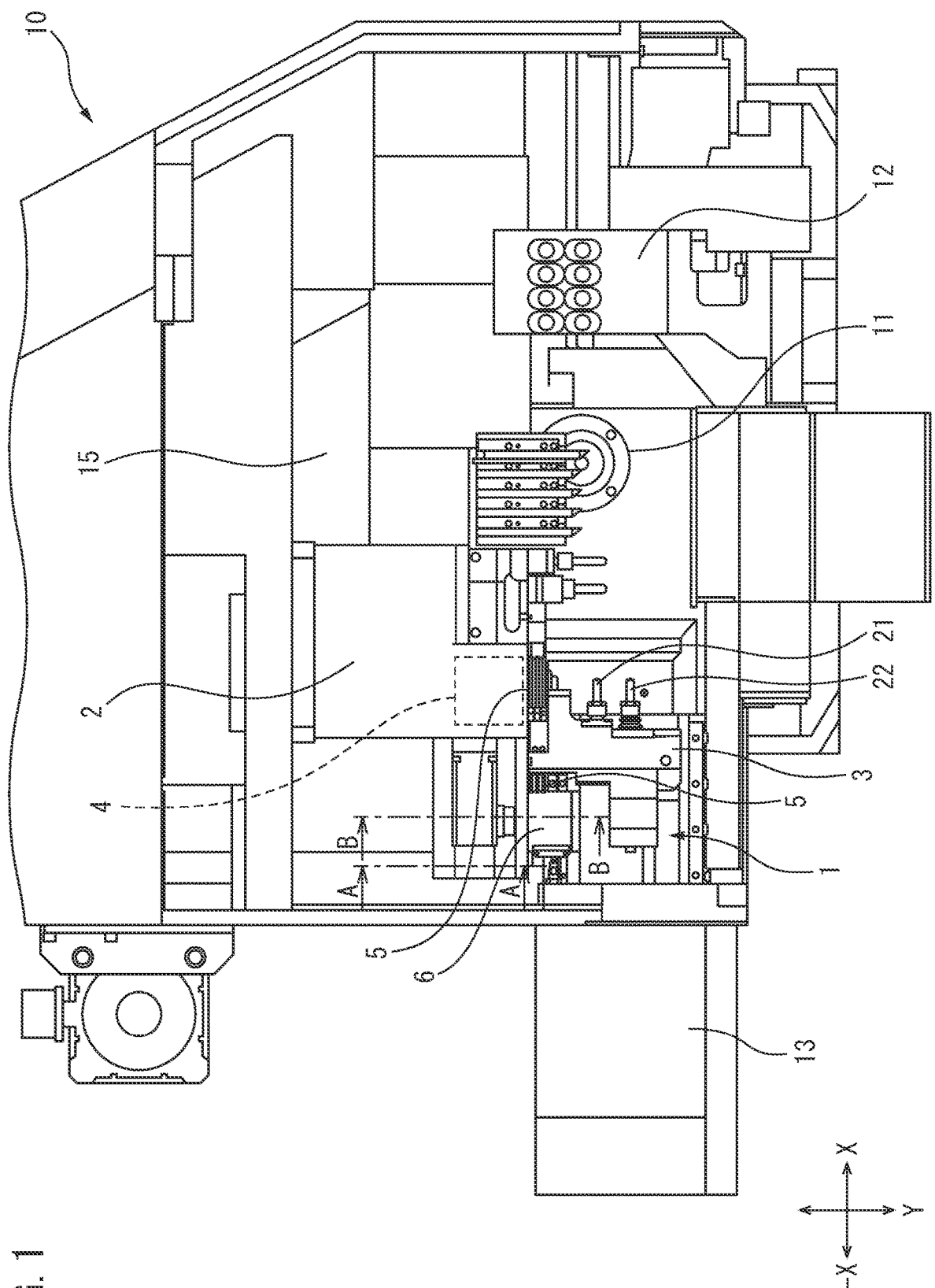

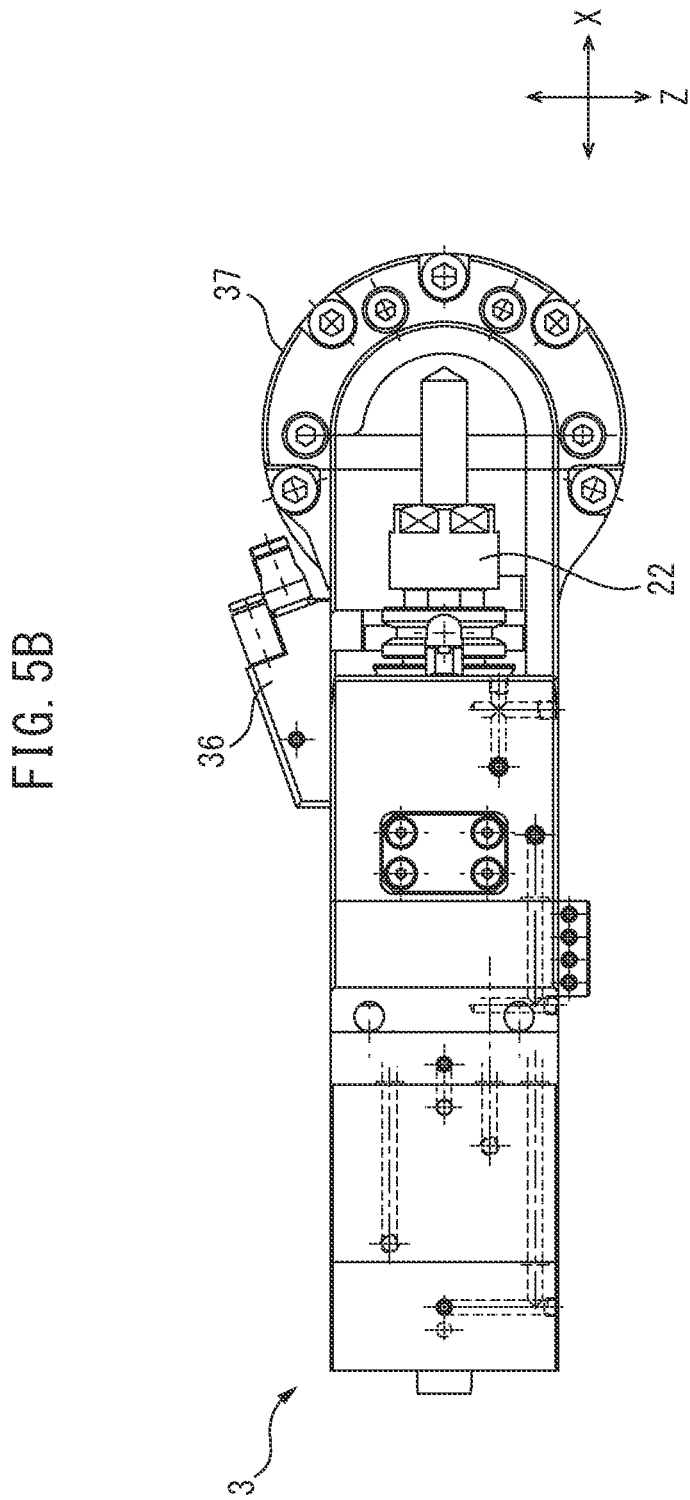

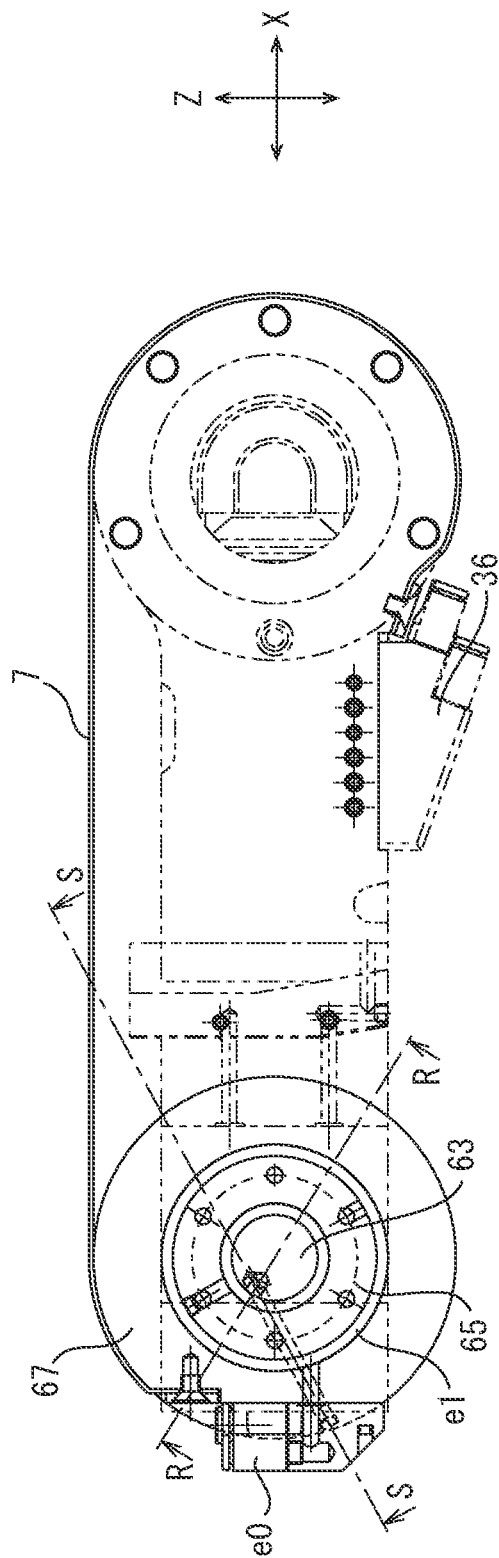

TOOL REST AND MACHINE TOOL

FIELD

The present invention relates to a tool rest and a machine tool.

BACKGROUND

In a machine tool, various techniques is known for absorbing a slack of a linear member such as a cable generated by a slide and swing of a tool (e.g., Patent Document 1).

RELATED DOCUMENTS

Patent Document 1 Japanese Laid Open Patent Document No. 2010-162646

SUMMARY

However, in the machine tool described in Patent Document 1, since the concentrated slack absorbing portion for absorbing the slack of the linear member such as a cable is required, the size of a tool rest may increase.

An object of the present invention is to provide a compact tool rest without slacking a linear member connected to a tool holding device by rotating a tool.

A tool rest of an embodiment has a base, a tool holder rotatably supported on the base, and rotatably holding a tool, a rotational mechanism rotating the tool holder, a plurality of flexible linear members in which one ends of the plurality of linear members are connected with the tool holder and a winding device connected with the other ends of the plurality of linear members, and winding up the plurality of linear members by rotating when the tool holder is rotated by the rotational mechanism.

Further, in the tool rest, it is preferable that the winding device includes a shaft member rotatably supported on the base, a fixing member arranged along outer periphery of the shaft member and fixed on the base, a disk-shaped joining member jointed to an end of the shaft member, and a rotating member rotating when the tool holder rotates, by jointing to the outer edge of the joining member, and connected with the other ends of the plurality of linear members.

Further, in the tool rest, it is preferable that the plurality of linear members includes a plurality of fluid pipes applying a fluid for controlling mounting and removal of the tool to the tool holder.

Further, in the tool rest, it is preferable that the tool holder rotating between a first stop position and a second stop position rotating 180 degree from the first stop position, and internal pipes connected with each of the plurality of fluid pipes are formed in the fixing member.

Further, in the tool rest, it is preferable that the plurality of linear members includes an auxiliary band arranged in parallel to a plurality of fluid pipes.

A machine tool of an embodiment includes a main shaft rotatably holding a workpiece, and a tool rest holding a tool cutting the workpiece, wherein the tool rest includes a base, a tool holder rotatably supported on the base, and rotatably holding a tool, a rotational mechanism rotating the tool holder, a plurality of flexible linear members in which one ends of the plurality of linear members are connected with the tool holder, and a winding device connected with the other ends of the plurality of linear members, and winding up the plurality of linear members by rotating when the tool holder is rotated by the rotational mechanism.

Since the linear member connected to the tool holding device by the winding device does not slack by rotating of the tool, a tool rest according to the present invention may be compact.

BRIEF DESCRIPTION OF DRAWINGS

FIG. 1 is a portion cross-sectional view of a machine tool equipped with a tool rest according to the embodiment;

FIG. 5B is a bottom view of the tool holder shown in FIG. 1;

FIG. 17A is a sectional view taken along line H-H shown in FIG. 15A;

Figure 2:
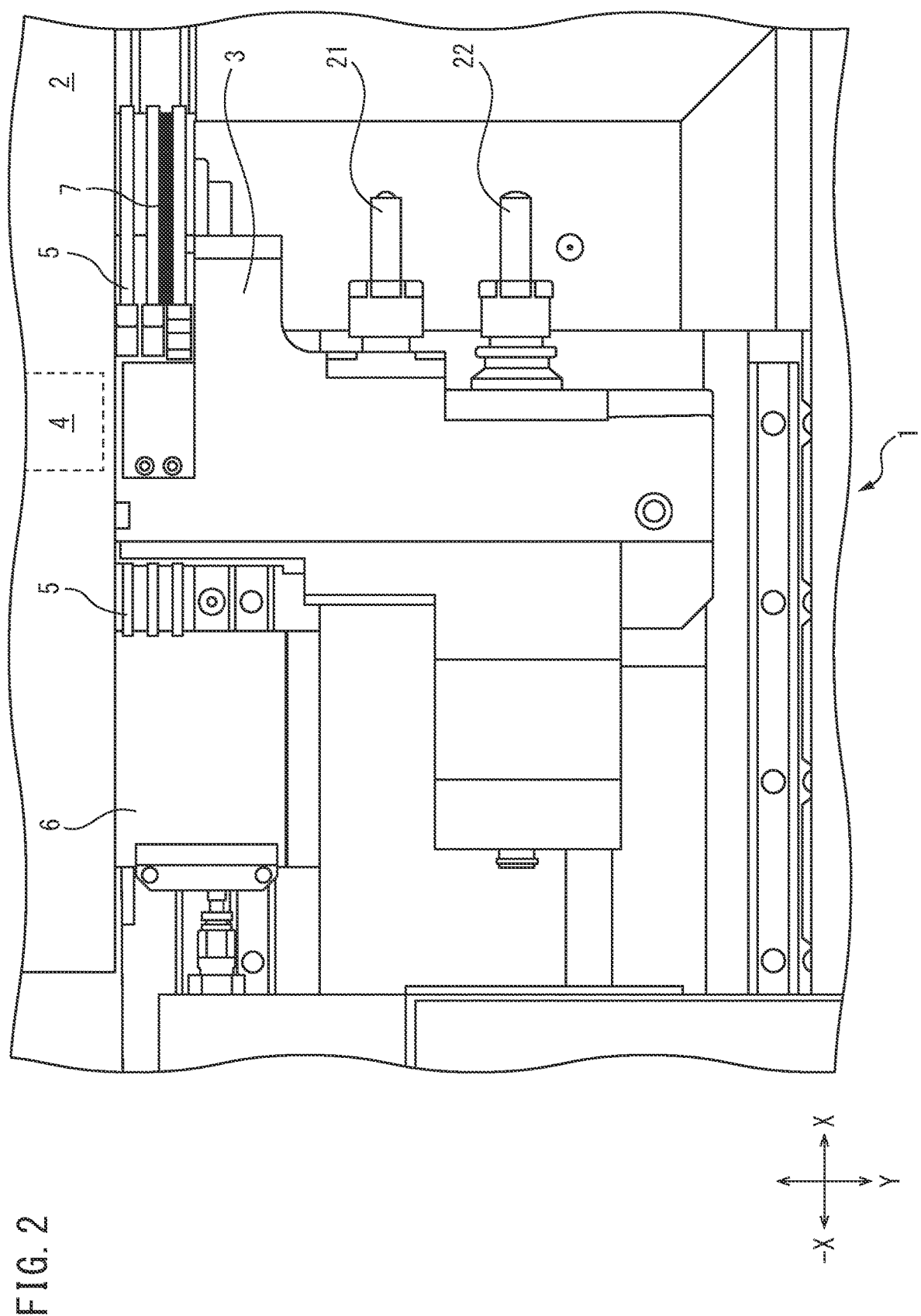
FIG. 2 is a portion enlarged view including the tool rest shown in FIG. 1.
Figure 3A:
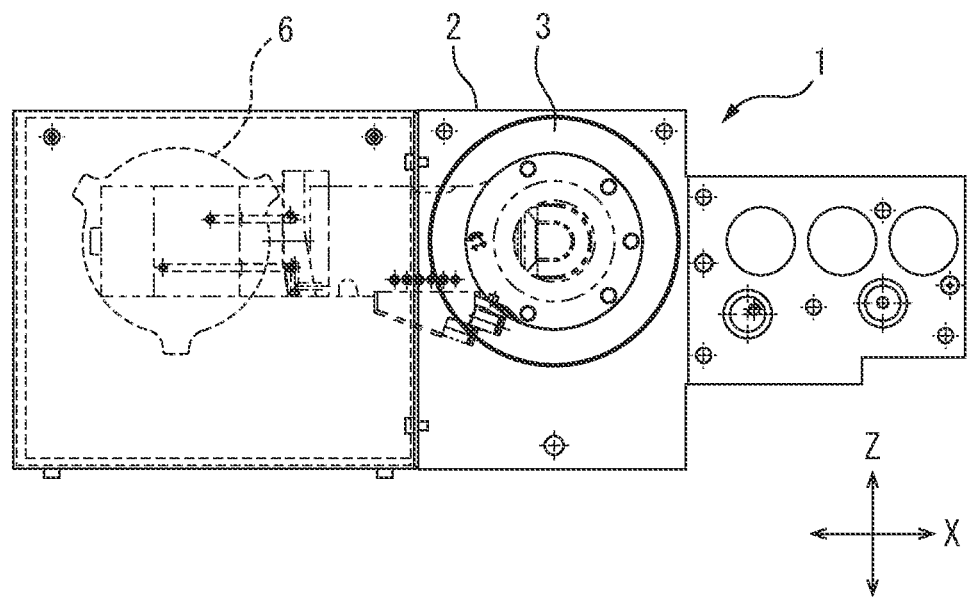
FIG. 3A is a plan view of the tool rest shown in FIG. 1.
Figure 3B:
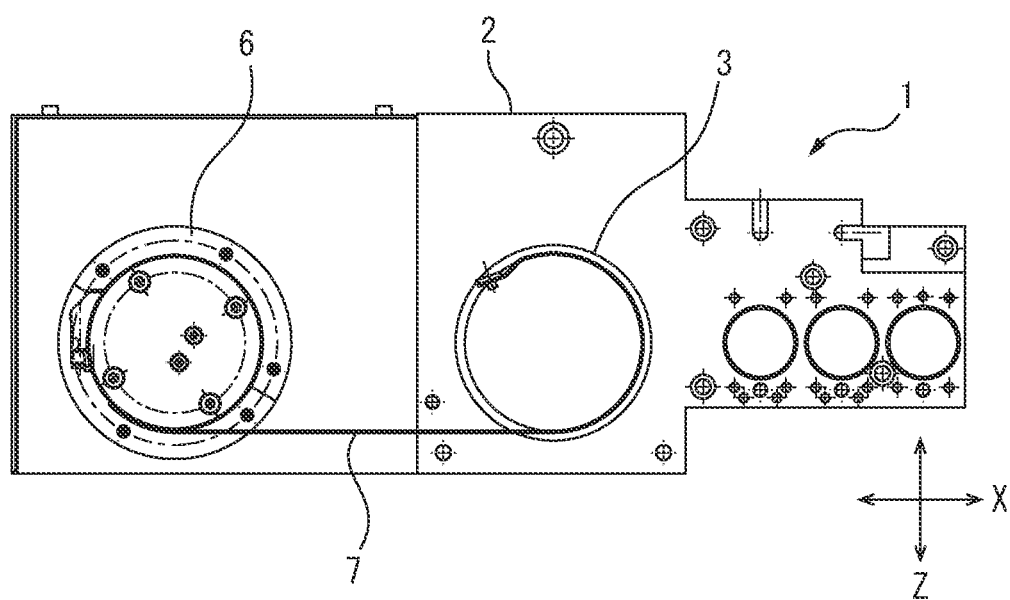
FIG. 3B is a bottom view of the tool rest shown in FIG. 1.
Figure 3C:
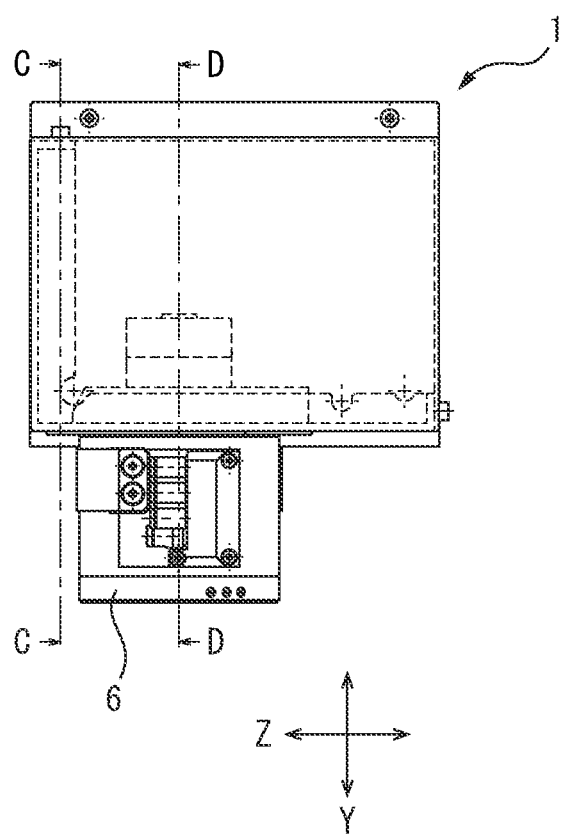
FIG. 3C is a left side view of the tool rest shown in FIG. 1.
Figure 4A:
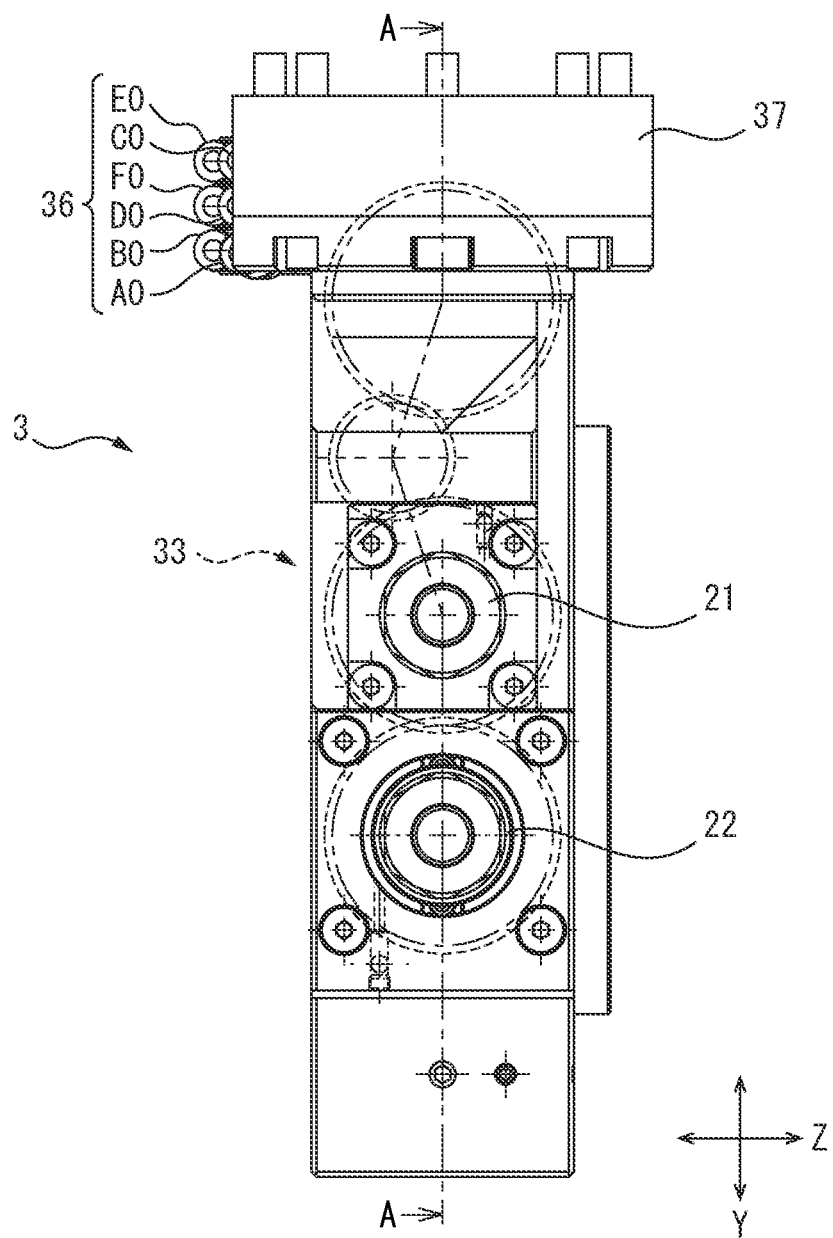
FIG. 4A is a front view of the tool holder shown in FIG. 1.
Figure 4B:
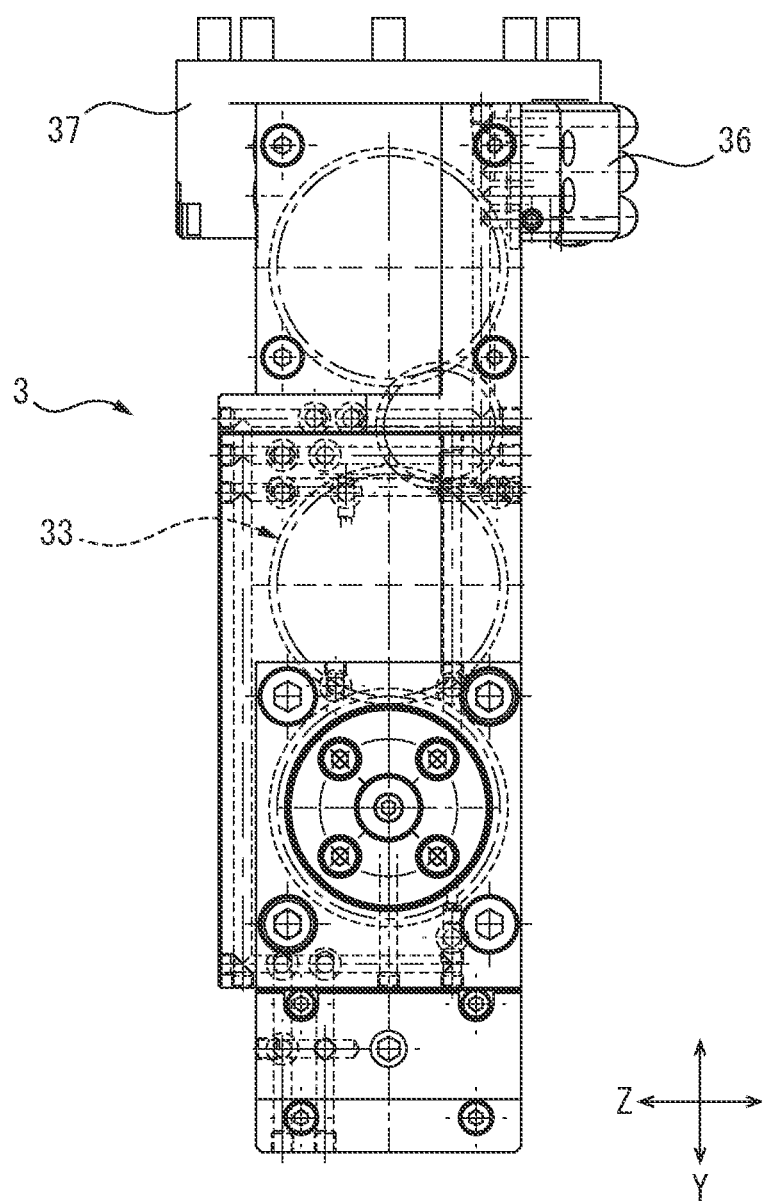
FIG. 4B is a rear view of the tool holder shown in FIG. 1.
Figure 5A:
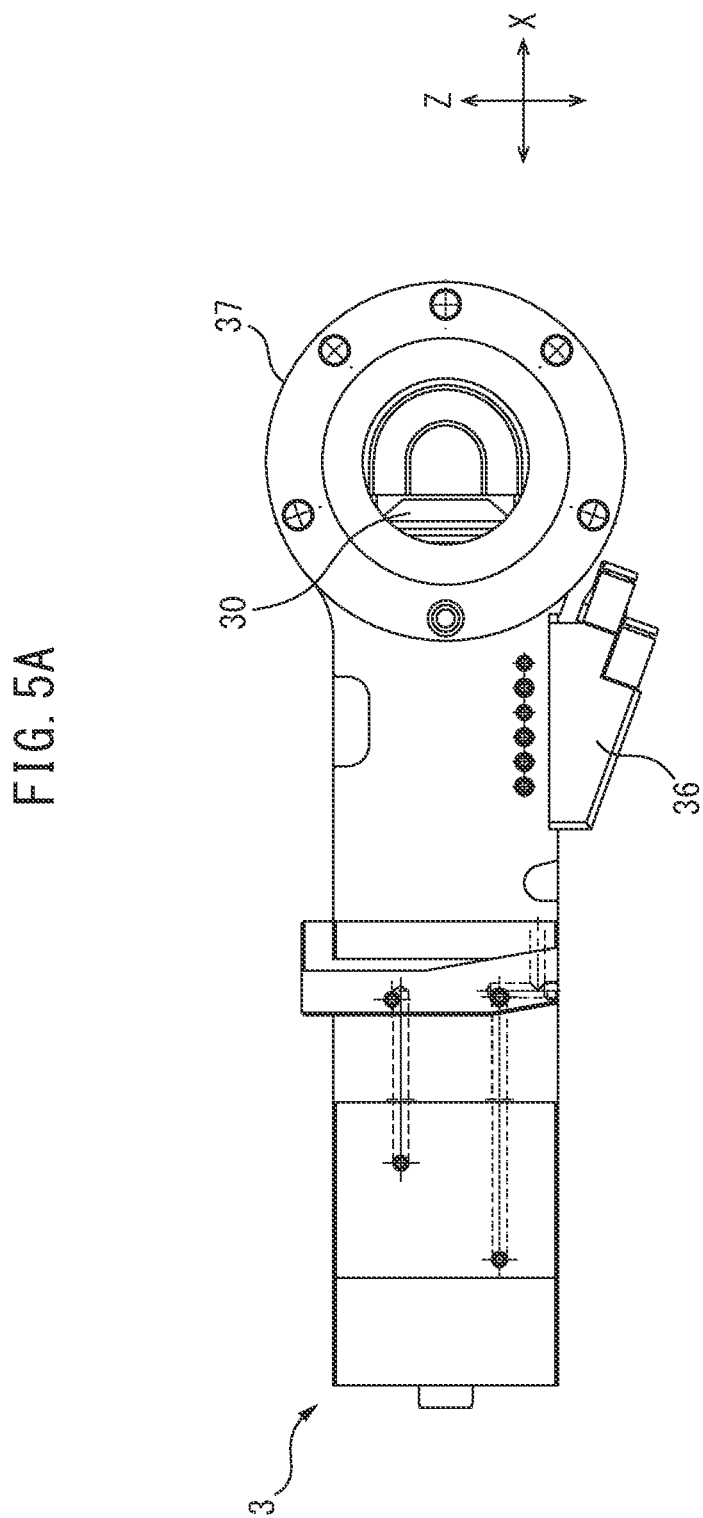
FIG. 5A is a plan view of a tool holder shown in FIG. 1.
Figure 6A:
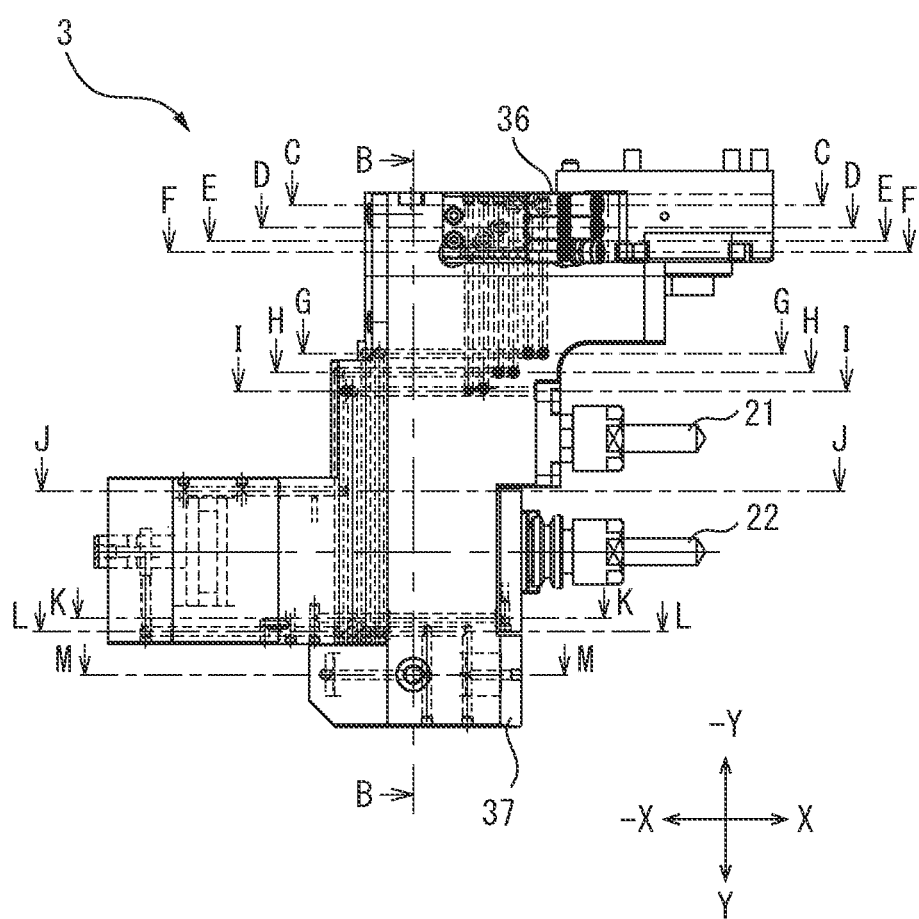
FIG. 6A is a left side view of the tool holder shown in FIG. 1.
Figure 6B:
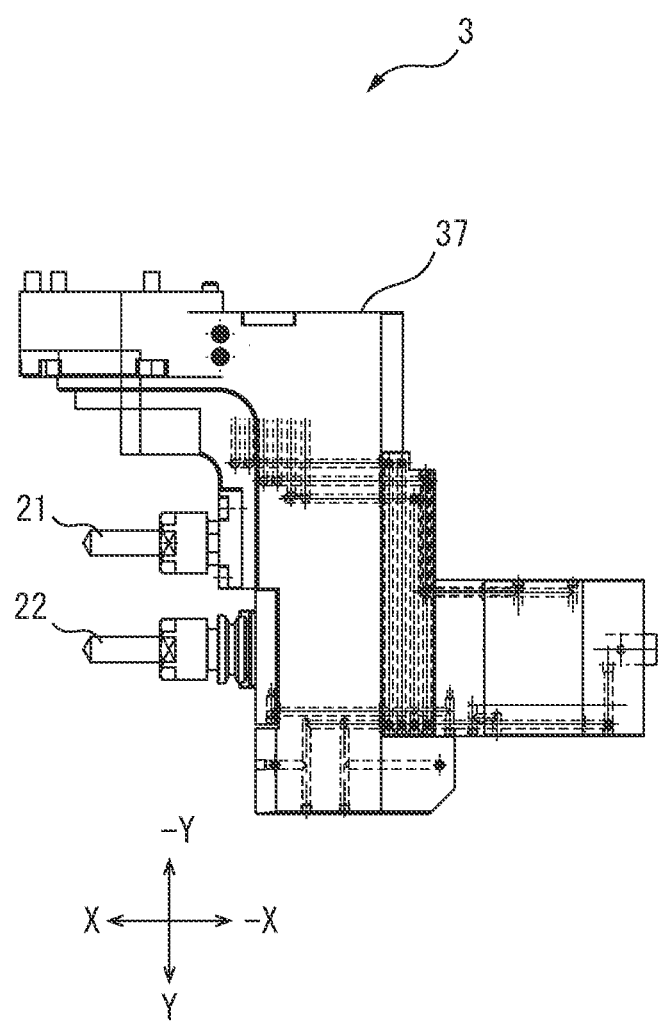
FIG. 6B is a right side view of the tool holder shown in FIG. 1.

DESCRIPTION OF EMBODIMENTS (Configuration and Function of the Tool Rest According to the Embodiment)

As shown in FIG. 1, a machine tool 10 houses a main shaft 11, a rear tool rest 12, an automatic tool changer 13, a tool rest 1 and the like in a body 15. The main shaft 11, the rear tool rest 12, the automatic tool changer 13 and the tool rest 1 and the like are controlled by an NC device (not shown). The main shaft 11 rotatably holds a workpiece cut by the tool rest 1 holds. The rear tool rest 12 performs cutting processing to the workpiece, when the workpiece is held by a rear shaft. The automatic tool changer 13 houses a plurality of replaceable rotary tools used in the tool rest 1.

As shown in FIGS. 1 to 3C, the tool rest 1 has a base 2, a tool holder 3, a rotational mechanism 4, a plurality of pneumatic pipes 5, a winding device 6 and an auxiliary bands 7. The base 2 is supported by the body 15 movably in the X-axis direction. The tool holder 3 is also referred to as a tool holding device, and rotatably supported on the base 2, and rotatably holding a first rotary tool 21 and a second rotary tool 22.

The rotational mechanism 4 is disposed in the base 2, and rotates the tool holder 3 based on an instruction from the NC device. When the rotational mechanism 4 rotates, the tool holder rotates around the Y-axis direction also referred to as the B-axis direction over a range of 180 degrees between a first stop position which is a stop position for machining a workpiece gripped by the main shaft 11 and a second stop position which is a stop position for exchanging a tool with the automatic tool changer 13. In the first stop position, the tool holder 3 is disposed so that the cutting edges of the first rotary tool 21 and second rotary tool 22 extend in the X-axis direction toward the main shaft 11. On the other hand, in the second stop position, the tool holder 3 is disposed so that the cutting edges of the first rotary tool 21 and second rotary tool 22 extend in the −X axis direction toward the automatic tool changer 13.

Each of the plurality of air pipes 5 is a flexible tubular member formed by, for example, synthetic resin. One ends of the air pipes 5 are connected to the tool holder 3 and the other ends of the air pipes 5 are connected to the winding device 6, and the air pipes 5 are supplied compressed air from the compressor (not shown) used for controlling the mounting and removal of the second rotary tool 22 on the tool holder 3.

A rotational force generated by the compressed air which is an example of a fluid is applied to the winding device 6, in a direction to wind up the air pipes 5 which are examples of a plurality of fluid pipes and the auxiliary band 7, and the winding device 6 is rotated in accordance with the rotation of the tool holder 3 by the rotational mechanism 4, and the air pipes 5 and the auxiliary band 7 are wound up by the rotational force applied in the turning range of the tool holder 3.

The auxiliary band 7 is a belt-shaped member, and arranged in parallel to a plurality of air pipes 5 between the tool holder 3 and the winding device 6. The auxiliary band 7 is arranged in parallel to the plurality of air pipes 5, and therefore the auxiliary band 7 assists winding motion by a plurality of air pipes 5.

Figure 7:
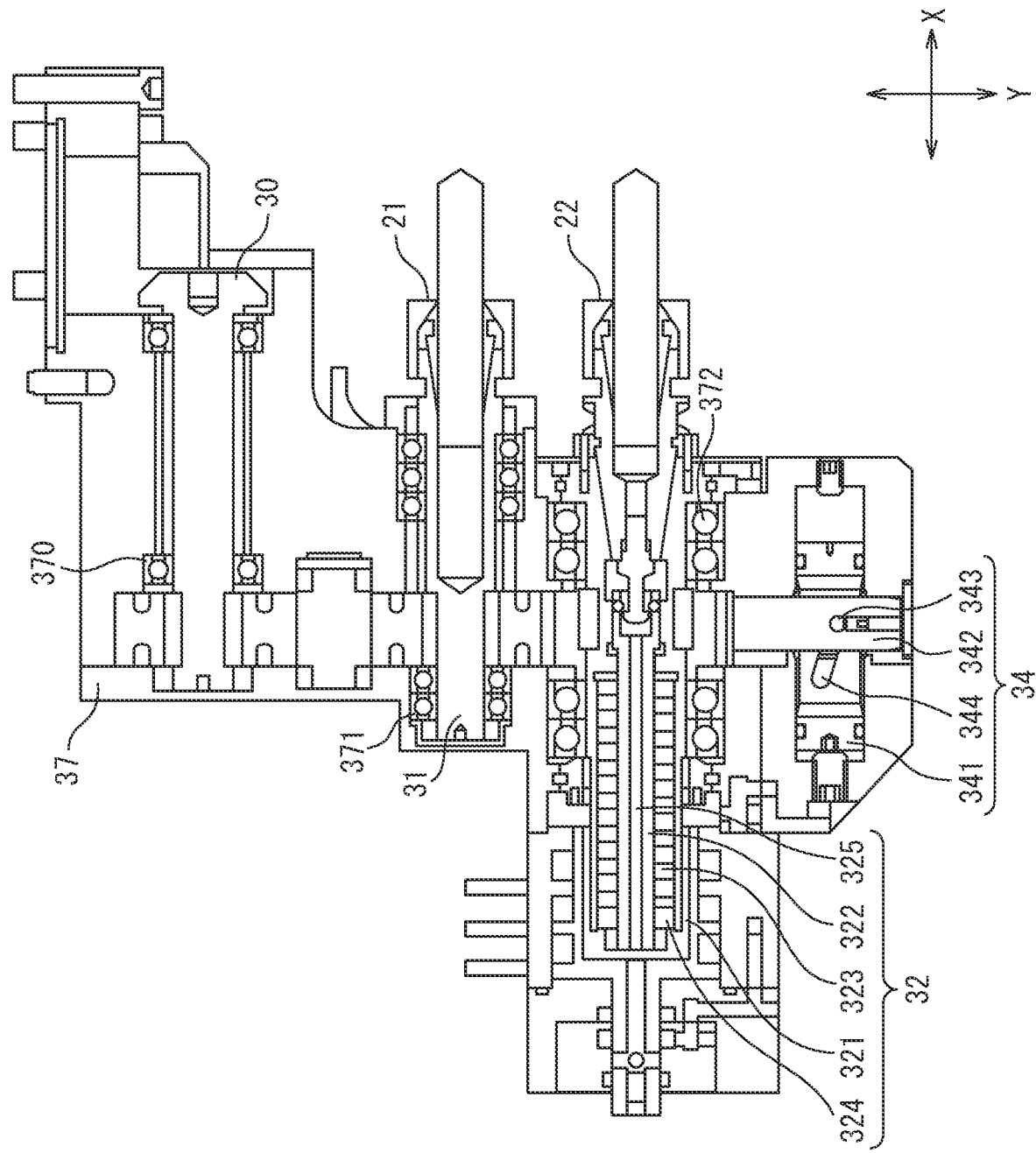
FIG. 7 is a cross-sectional view taken along line A-A shown in FIG. 4A.

As shown in FIGS. 4A to 8, the tool holder 3 houses a drive shaft 30, a first rotary shaft 31, a second rotary shaft 32, a power transmission mechanism 33, a rotation restricting mechanism 34 and a holder air port group 36 in the holder housing 37. As shown in FIG. 7, the drive shaft 30 is a shaft member extending in the X-axis direction, and rotatably supported by the holder housing 37 via a bearing 370. The first rotary shaft 31 is a shaft member extending in the X-axis direction, one end of the first rotary shaft 31 holds the first rotary tool 21, and the other end of the first rotary shaft 31 is rotatably supported by the power transmission mechanism 33 via a bearing 371.

The second rotary shaft 32 has a shaft portion 321, a tool holding portion 322, an elastic member 323, and a fixing member 324, and rotatably supported by the holder housing 37 via a bearing 372. An air hole 325 penetrating in the X-axis direction to the fixing member 324 is formed through the shaft portion 321. One end of the tool holding portion 322 holds the second rotary tool 22, the other end of the tool holding portion 322 is slidably installed in the X-axis direction to the shaft portion 321, and the tool holding portion 322 is engaged with the fixing member 324. One end of the elastic member 323 is in contact with the recess formed in the shaft portion 321 of the second rotary tool 22 side, and the other end of the elastic member 323 is disposed so as to contact the fixing member 324. The other end of the tool holding portion 322 penetrates in the fixing member 324, the fixing member 324 has two cylindrical portions having different inner diameters, the side surface of the cylindrical portion having a large diameter is in contact with the inside of the shaft portion 321, and the fixing member 324 is slidably installed in the shaft portion 321 integrally with the tool holding portion 322. Since the shaft portion 321 penetrates in the fixing member 324, the air hole 325 is formed in the fixing member 324.

Figure 8:
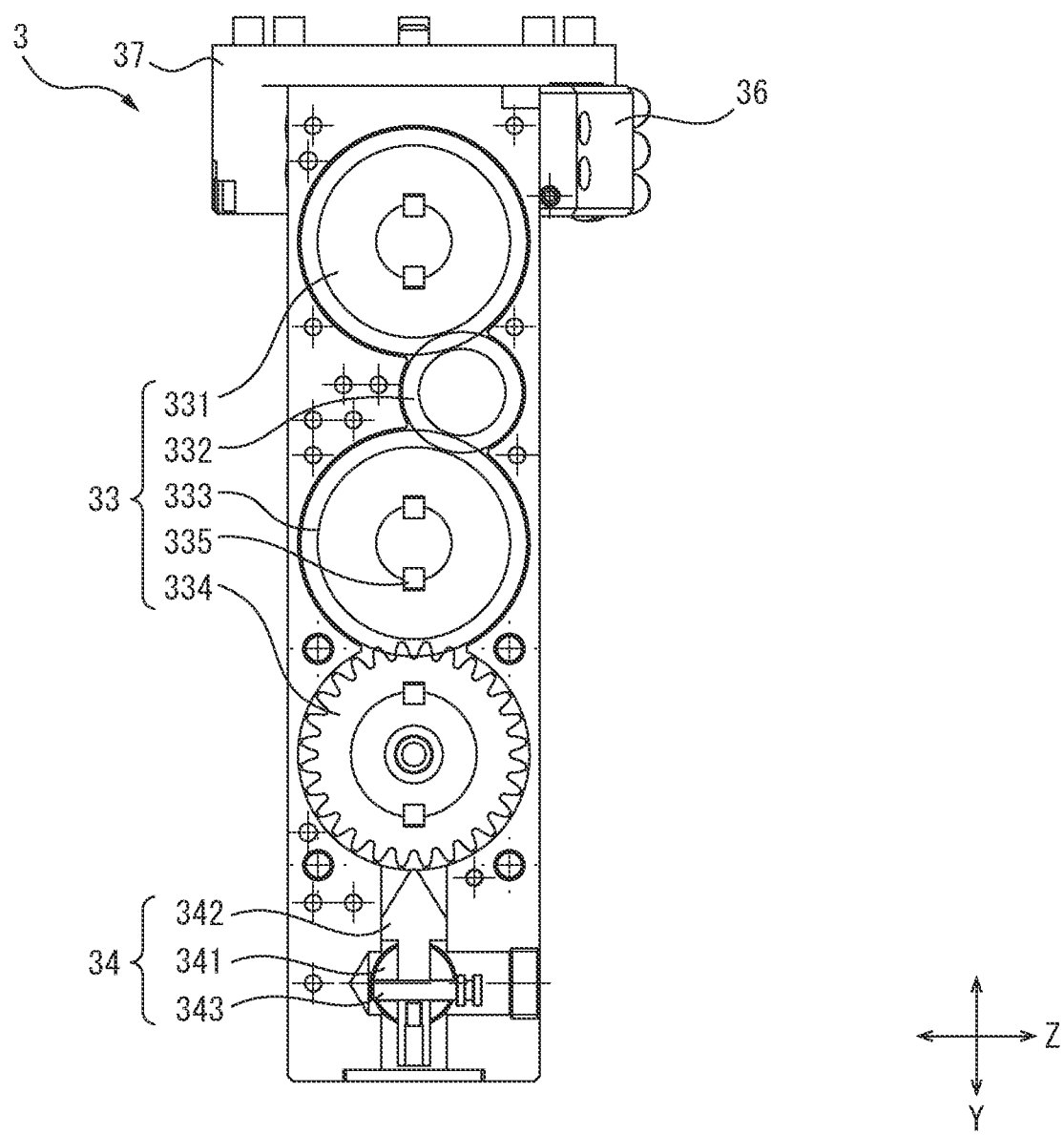
FIG. 8 is a sectional view taken along line B-B shown in FIG. 6A.
Figure 9A:
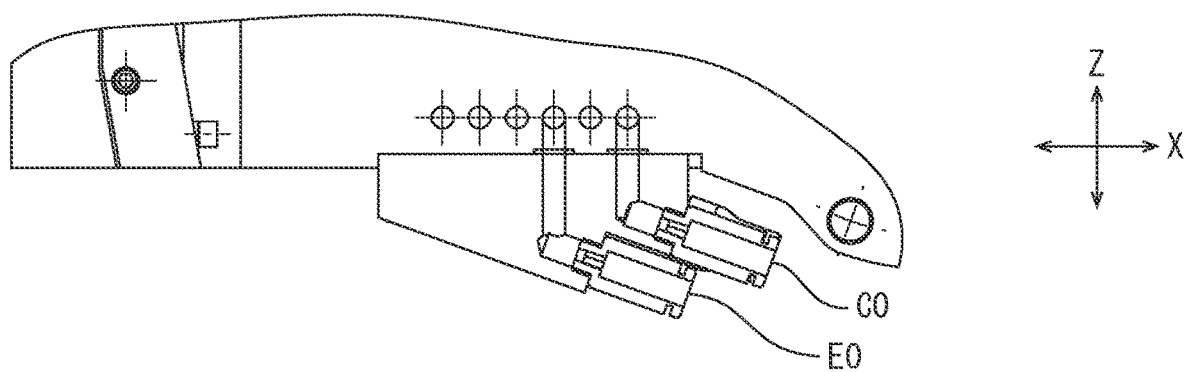
FIG. 9A is a sectional view taken along line C-C shown in FIG. 6A.
Figure 9B:
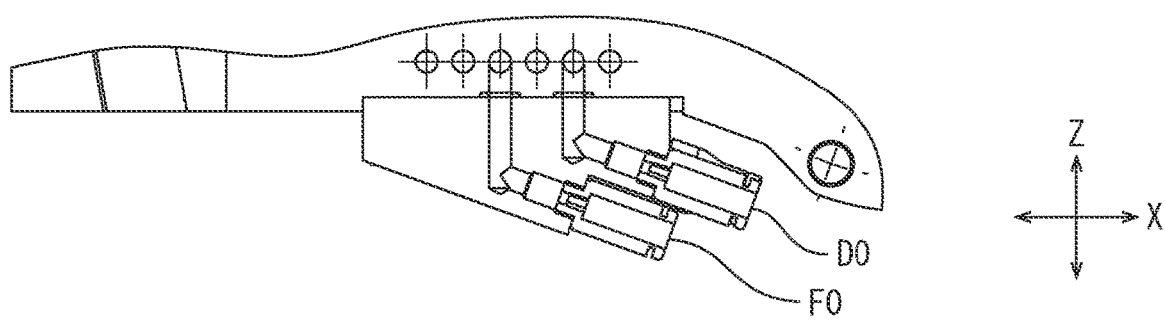
FIG. 9B is a cross-sectional view taken along line D-D shown in FIG. 6A.
Figure 9C:
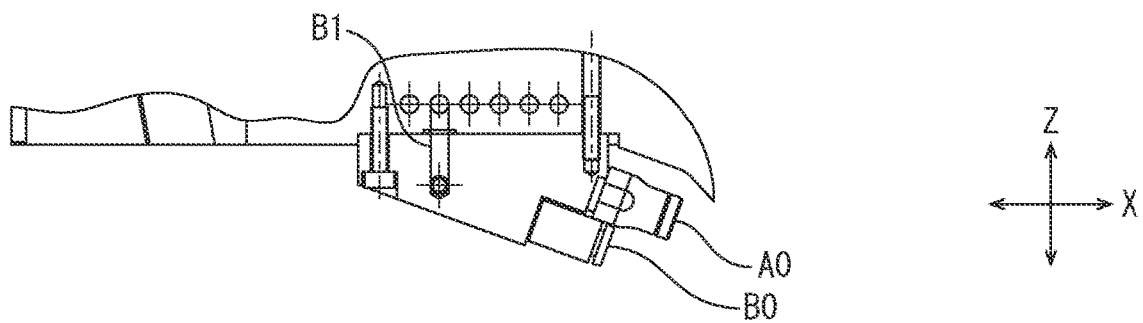
FIG. 9C is a cross-sectional view taken along E-E shown in FIG. 6A.
Figure 9D:
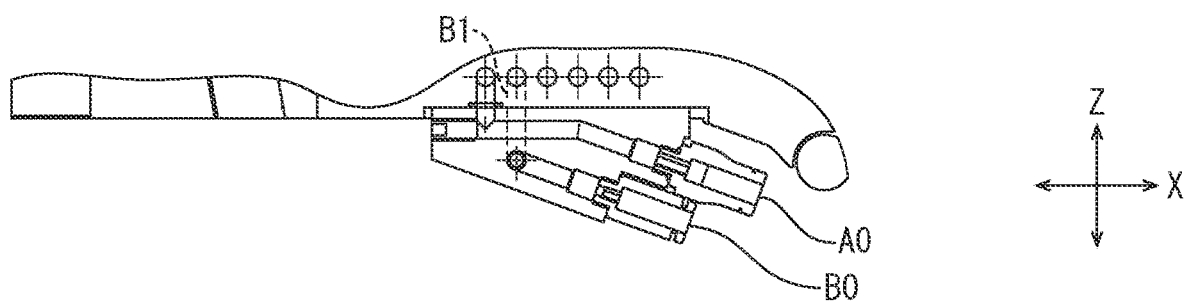
FIG. 9D is a sectional view taken along the line F-F shown in FIG. 6A.
Figure 10A:
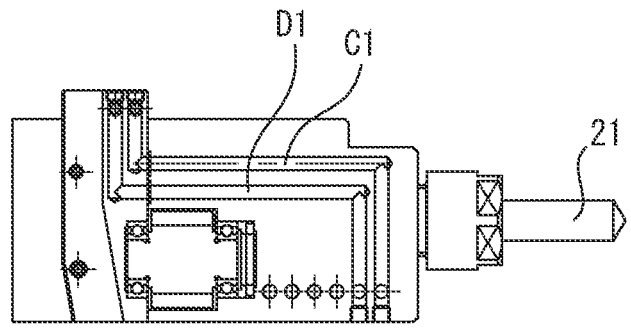
FIG. 10A is a cross-sectional view taken along line G-G shown in FIG. 6A.
Figure 10A:
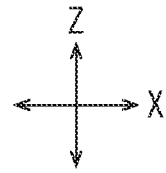
Figure 10B:
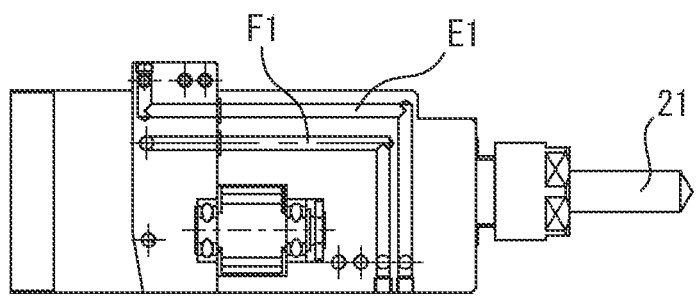
FIG. 10B is a sectional view taken along line H-H shown in FIG. 6A.
Figure 10B:
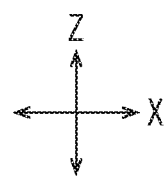
Figure 10C:
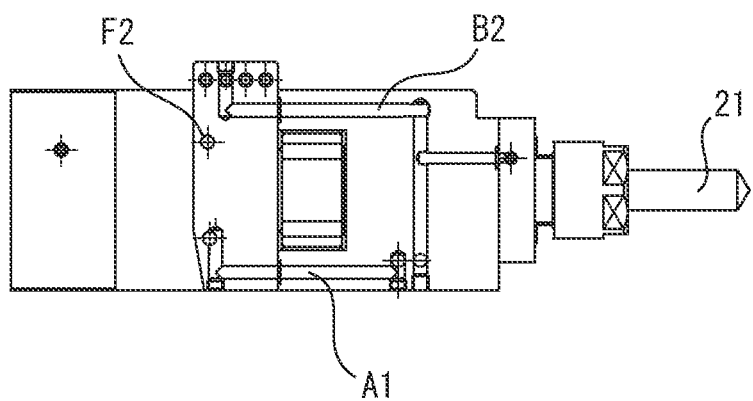
FIG. 10C is a cross-sectional view taken along I-I shown in FIG. 6A.
Figure 10C:
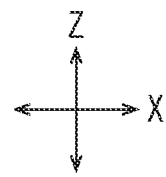
Figure 11A:
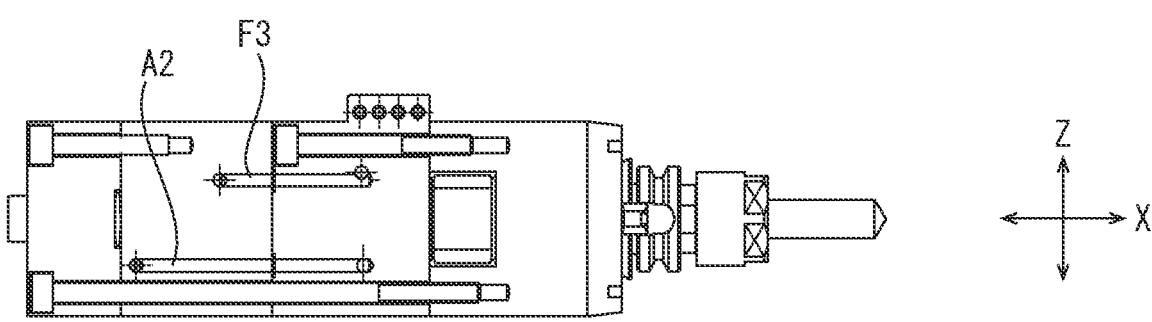
FIG. 11A is a cross-sectional view taken along line J-J shown in FIG. 6A.
Figure 11B:
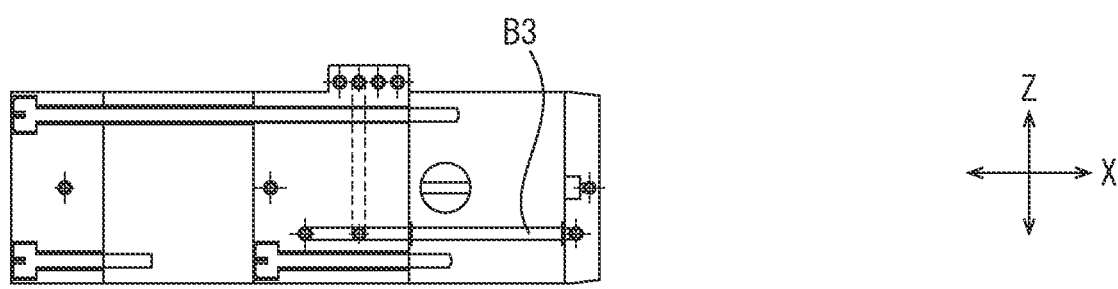
FIG. 11B is a cross-sectional view taken along line K-K shown in FIG. 6A.
Figure 11C:
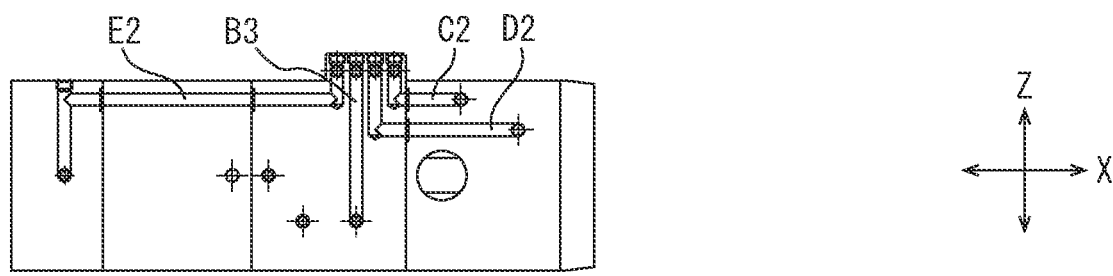
FIG. 11C is a cross-sectional view taken along L-L shown in FIG. 6A.
Figure 11D:
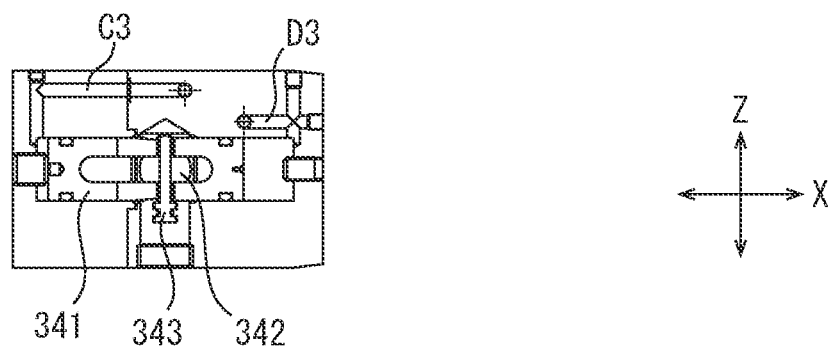
FIG. 11D is a cross-sectional view taken along line M-M shown in FIG. 6A.

As shown in FIG. 8, the power transmission mechanism 33 has a first gear 331, a second gear 332, a third gear 333 and a fourth gear 334 disposed to mesh with each other, and transmits a power transmitted via the drive shaft 30 to the first rotary shaft 31 and second rotary shaft 32. The first gear 331 is engaged with the drive shaft 30 via an engaging member 335 such as a key. The third gear 333 is engaged with the first rotary shaft 31 via the engaging member 335. The fourth gear 334 is engaged with the second rotary shaft 32 via the engaging member 335.

As shown in FIGS. 7 and 8, the rotational restricting mechanism 34 has a piston 341, a locking member 342 and a connecting member 343. The piston 341 is a cylindrical member extending in the X-axis direction which is the axial direction of the drive shaft 30, the first rotary shaft 31 and the second rotary shaft 32. A groove 344 is formed on the piston 341 extending in a direction different from either the X-axis direction and Y-axis direction. The groove 344 is inclined substantially 15 degree from the X-axis direction toward the Y-axis direction.

The locking member 342 has a substantially conical locking portion at the upper end, and moves in the Y-axis direction in connection with the movement of the piston 341 in the X-axis direction, and therefore when the locking portion is engaged with the tooth groove of the fourth gear 334, rotations of the drive shaft 30, the first rotary shaft 31 and the second rotary shaft 32 are restricted. The connecting member 343 is a rod-shaped member, and one end of the connecting member 343 is fixed to the locking member 342 and the other end of the connecting member 343 is inserted into the groove 344.

As shown in the FIG. 9A-9D, the holder air port group 36 has a first air port AO, a second air port B0, a third air port CO, a fourth air port DO, a fifth air port E0 and a sixth air port FO connected to the air pipes 5, and when the tool holder 3 is rotated to the second stopping position, compressed air is supplied through the air pipes 5 to the holder air port group 36. When the second rotary tool 22 is replaced, a series of operations is performed by the respective configurations by supplying compressed air to the tool holder 3 via the air pipes 5.

It is explained that a series of operations according to the respective configuration when the second rotary tool 22 is replaced. When compressed air is supplied from the first air port AO, the tool holding portion 322 and fixing member 324 move in the X-axis direction shown in FIG. 7, and therefore the second rotary tool 22 is released from the holding by the tool holding portion 322. When the compressed air is supplied from the second air port B0, if the air pressure is high or the flow rate is large, the NC device determines that the second rotary tool 22 is in close contact. On the other hand, when the compressed air is supplied from the second air port B0, if the air pressure is low or the flow rate is low, the NC device determines that the second rotary tool 22 is not in close contact. Thus, the mounting state of the second rotary tool 22 may be confirmed.

When compressed air is supplied from the third air port CO, the piston 341 moves in the X-axis direction. When the piston 341 is moved, the locking member 342 moves in the −Y axis direction shown in FIG. 7, and meshes with the teeth groove of the fourth gear 334, and therefore the rotations of the drive shaft 30, the first rotary shaft 31 and the second rotary shaft 32 are restricted.

When compressed air is supplied from the fourth air port DO, the piston 341 moves in the −X-axis direction. When the piston 341 moves in the −X axis direction, the locking member 342 moves in the Y-axis direction shown in FIG. 7, and away from the tooth groove of the fourth gear 334, and therefore the drive shaft 30, the first rotary shaft 31 and the second rotary shaft 32 are in a rotatable state.

When compressed air is supplied from the fifth air port E0, the inside of the second rotary shaft 32 is blow-cleaned through the air hole 325. When compressed air is supplied from the sixth air port FO, the tool holding portion 322 and the fixing member 324 move in the −X axis direction shown in FIG. 7, and therefore the second rotary tool 22 is held in the tool holding portion 322.

Figure 12:
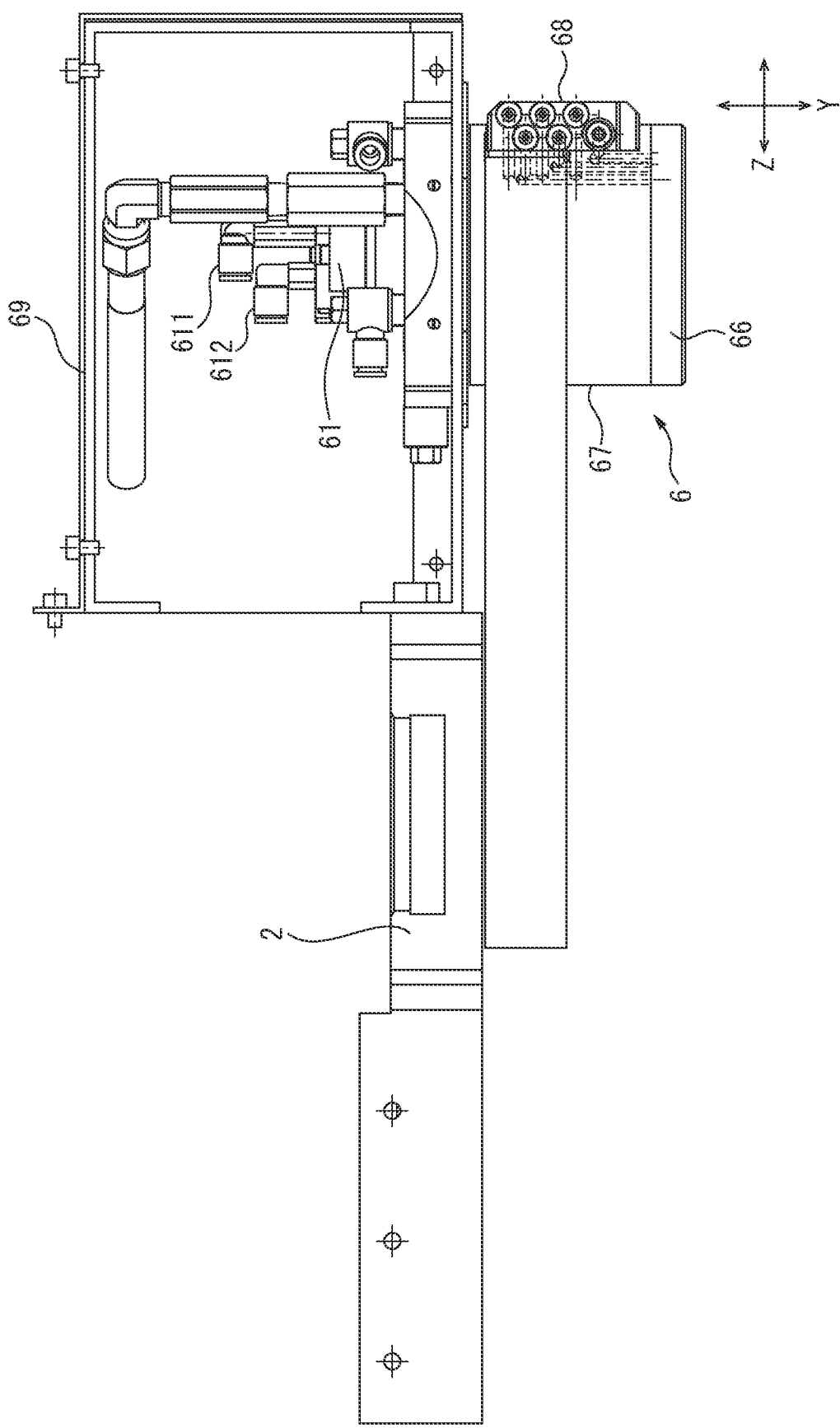
FIG. 12 is a cross-sectional view taken along line C-C shown in FIG. 3C.
Figure 13A:
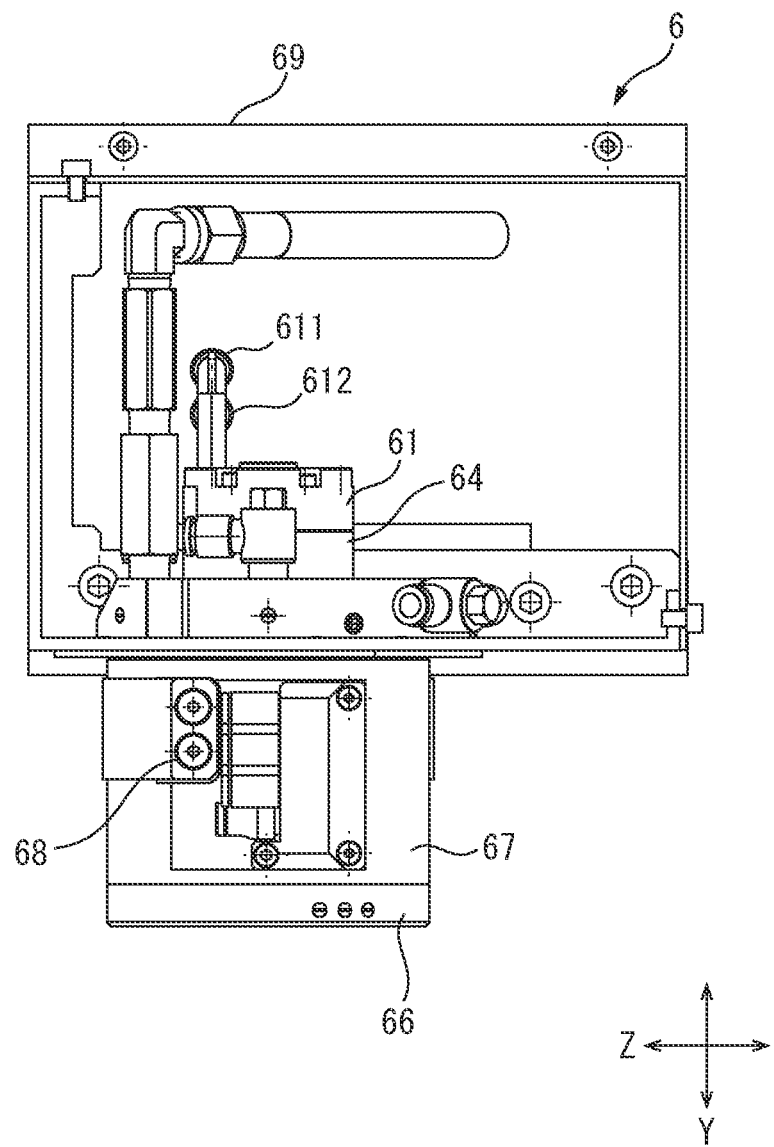
FIG. 13A is a sectional view taken along line A-A shown in FIG. 1.
Figure 13B:
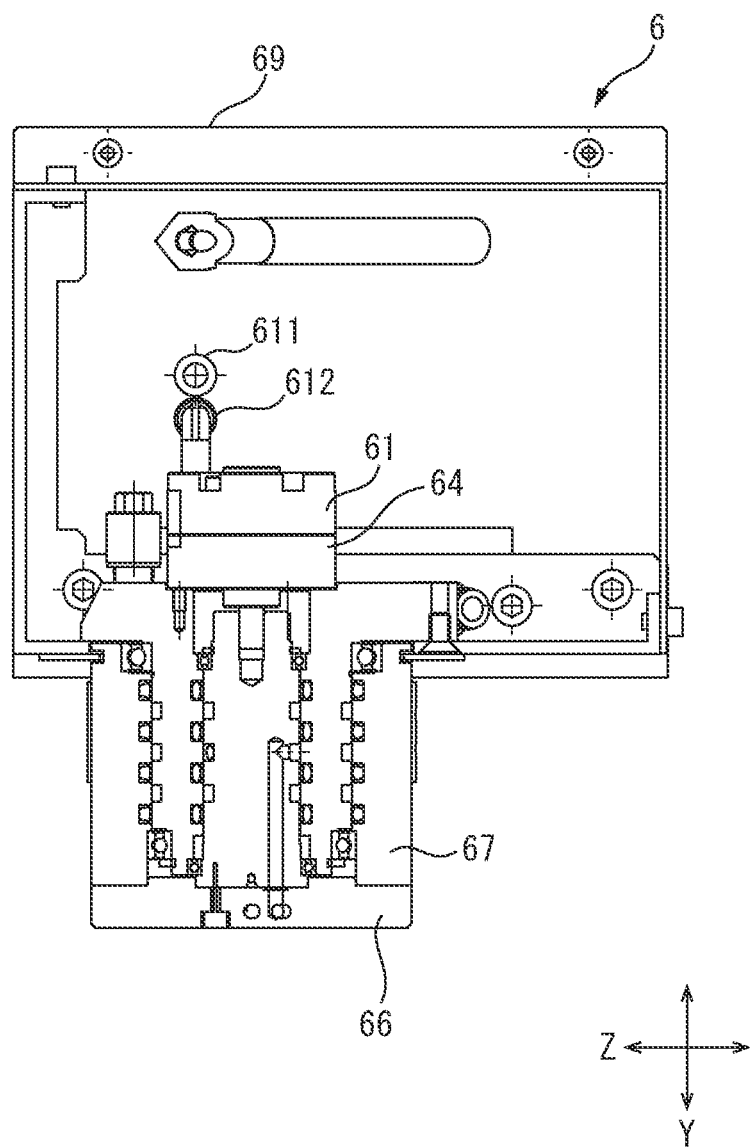
FIG. 13B is a sectional view taken along line B-B shown in FIG. 1.
Figure 14:
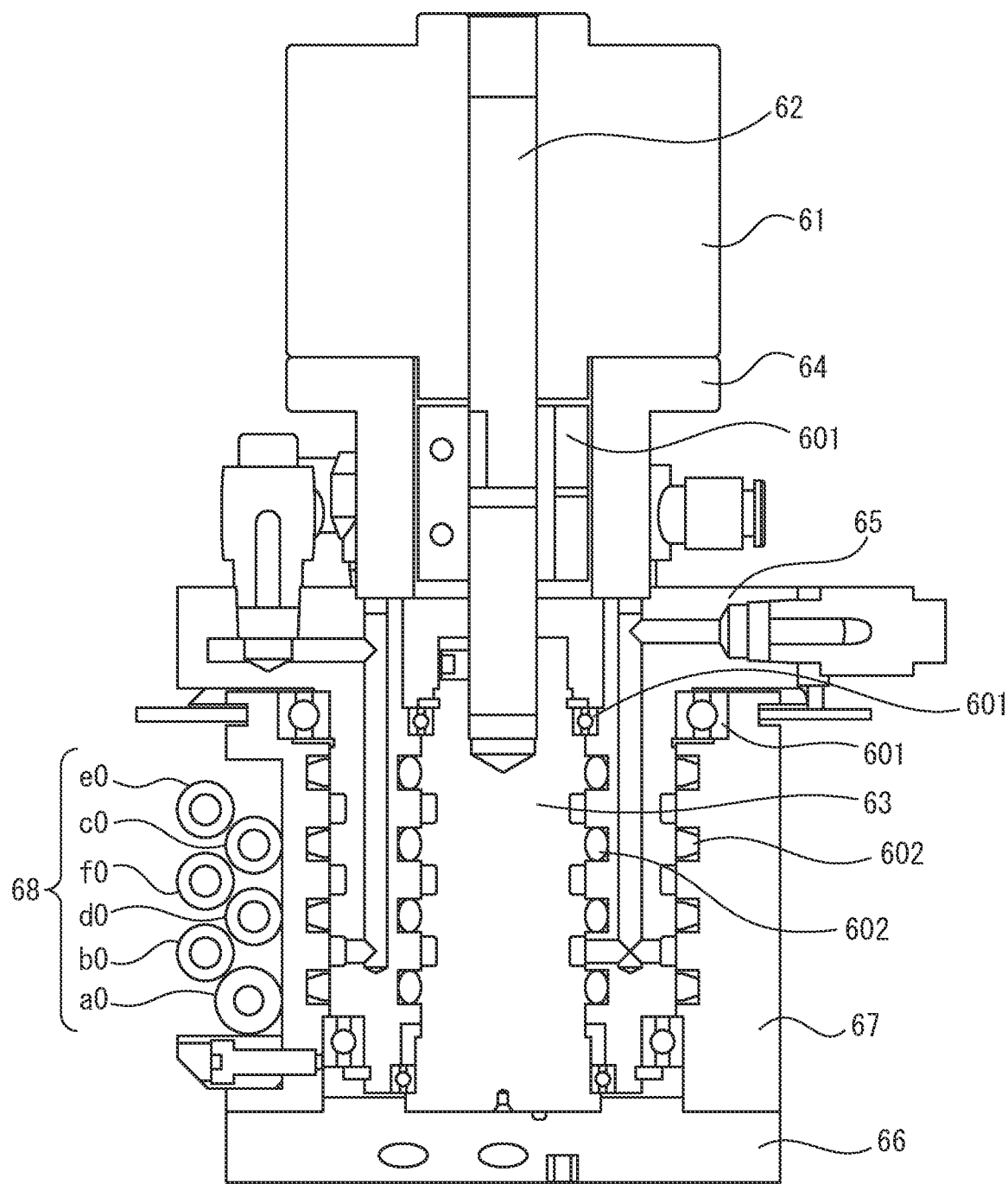
FIG. 14 is an enlarged sectional view taken along line D-D shown in FIG. 3C.

As shown in FIGS. 12-14, the winding device 6 houses the shaft support member 61, the first shaft member 62, the second shaft member 63, the first fixing member 64, the second fixing member 65, the bonding member 66, the rotating member 67 and the winding air port group 68 in the winding housing 69.

The shaft support member 61 is a cylindrical member, and the upper portion of the first shaft member 62 is inserted into the through hole penetrating the central portion of the shaft support member 61. The first shaft member 62 is a cylindrical member having a smaller diameter than the shaft support member 61, the upper portion of the first shaft member 62 is inserted into the shaft support member 61, and the lower portion of the first shaft member 62 is inserted into the second shaft member 63. The first shaft member 62 is rotatably supported by the first fixing member 64 via a bearing 601. The second shaft member 63 is a cylindrical member having a larger diameter than the shaft support member 61 and a larger diameter than the first shaft member 62. The lower portion of the first shaft member 62 is inserted into the upper of the second shaft member 63, and the second shaft member 63 is rotatably supported to the second fixing member 65 via a bearing 601 and sealing member 602.

The joining member 66 is a disk-shaped member, joined to an end of the second shaft member 63 at a central portion thereof, and joined to the rotating member 67 at the outer edge thereof. The rotating member 67 is a cylindrical member, and connected to the bonding member 66 at the lower end thereof. The inner wall of the rotating member 67 rotatably contacts the outer wall of the second fixing member 65 via the bearing 601 and sealing member 602. The winding air port group 68 is disposed on the outer wall of the rotating member 67.

The first shaft member 62 and the second shaft member 63, the joining member 66 and the rotating member 67 rotates in accordance with the rotation of the tool holder 3. A rotational force is applied to the first shaft member 62 in a winding direction of the air pipes 5 and auxiliary band 7, and therefore the first shaft member 62 rotates in accordance with the rotation of the tool holder 3 by the rotational mechanism 4, and winds up the air pipes 5 and auxiliary band 7 by the applied rotational force. A rotational force is applied to the first shaft member 62 in the winding direction of the air pipes 5 and auxiliary band 7 by the compressed air supplied from an air inlet 611. On the other hand, the shaft support member 61, the first fixing member 64 and the second fixing member 65 are fixed without rotating when the tool holder 3 rotates.

The winding air port group 68 includes a first air port a0, a second air port b0, a third air port c0, a fourth air port d0, a fifth air port e0, and a sixth air port f0, each of which is connected to a plurality of air pipes 5. The first air port a0 connects with the first air port AO of the holder air port group 36, the second air port b0 connects with the second air port B0 of the holder air port group 36, and the third air port c0 connects with the third air port CO of the holder air port group 36. The fourth air port d0 connects with the fourth air port DO of the holder air port group 36, the fifth air port e0 connects with the second air port E0 of the holder air port group 36, and the sixth air port f0 connects with the sixth air port FO of the holder air port group 36.

Figure 16A:
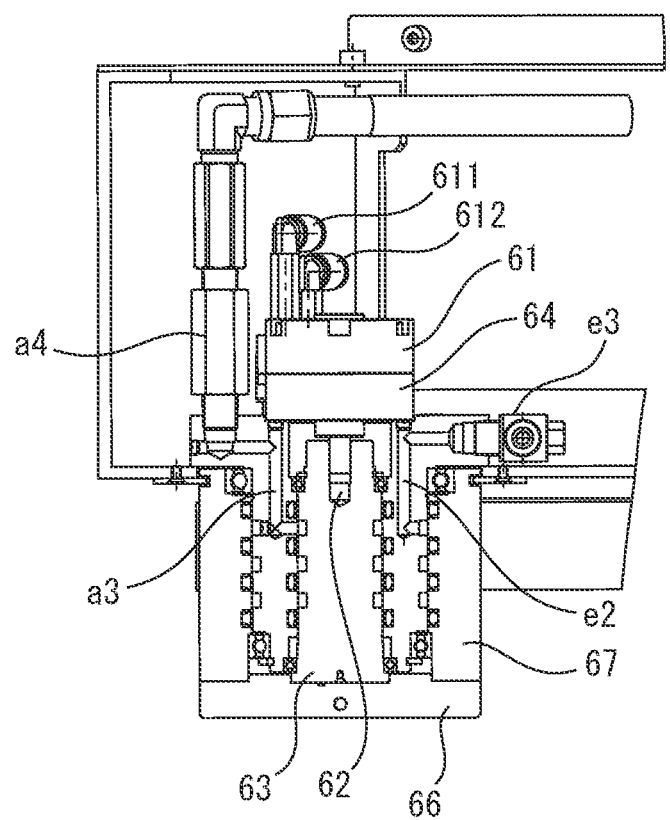
FIG. 16A is a cross-sectional view taken along the O-O line shown in FIG. 15B.
Figure 16B:
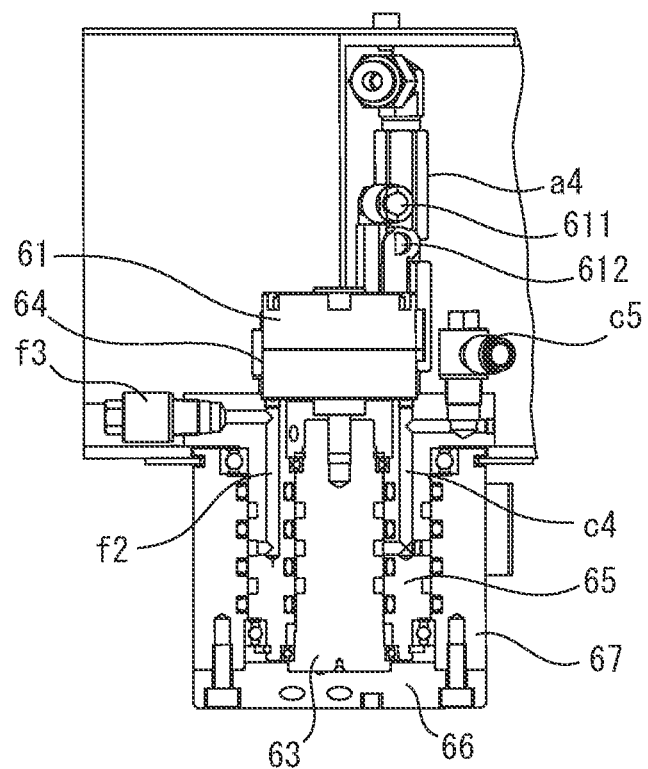
FIG. 16B is a sectional view taken along the line P-P shown in FIG. 15B.
Figure 16C:
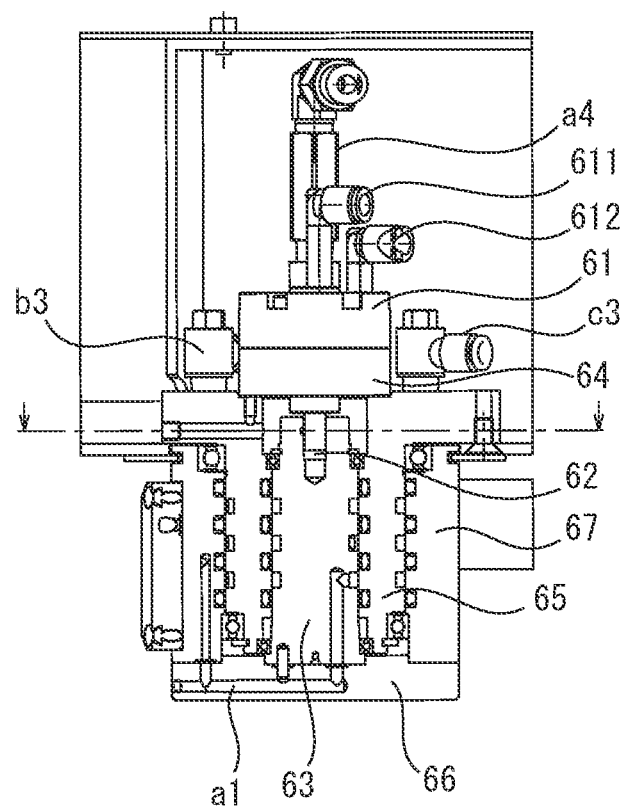
FIG. 16C is a cross-sectional view taken along the Q-Q shown in FIG. 15B.
Figure 18A:
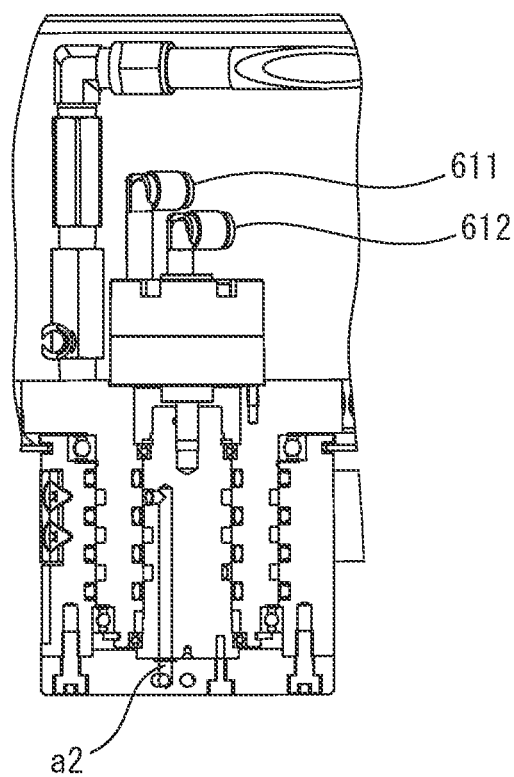
FIG. 18A is a cross-sectional view taken along the R-R line shown in FIG. 17A.
Figure 18B:
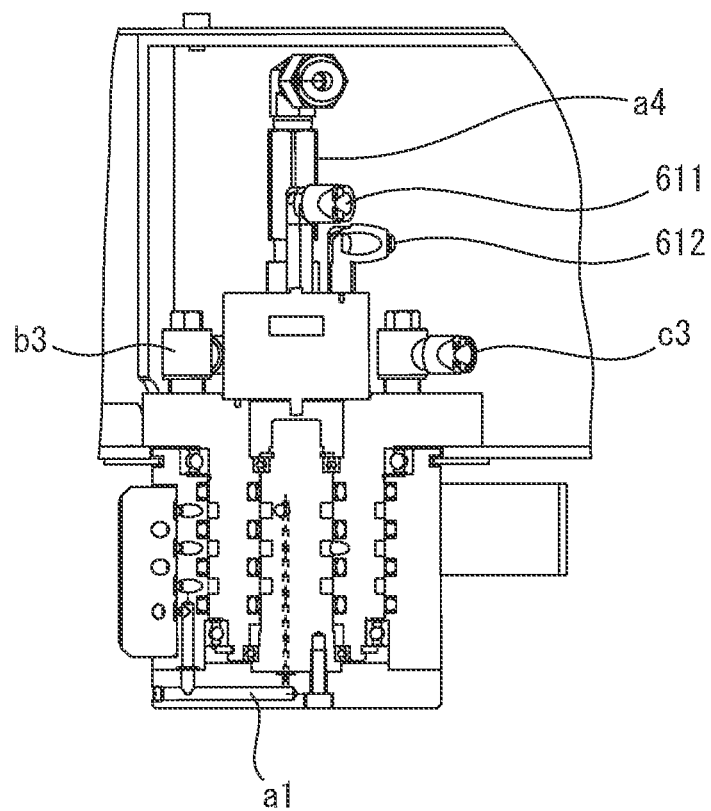
FIG. 18B is a sectional view taken along the line S-S shown in FIG. 17A.

In the first air port a0, when the tool holder 3 rotates to the second stop position, compressed air is supplied to the tool holder 3 through the first air port AO via the eleventh air pipe a1 shown in FIG. 16C, the twelfth air pipe a2 shown in FIG. 18A, the thirteenth air pipe a3 shown in FIG. 16A, and the fourteenth air pipe a4.

Figure 15A:
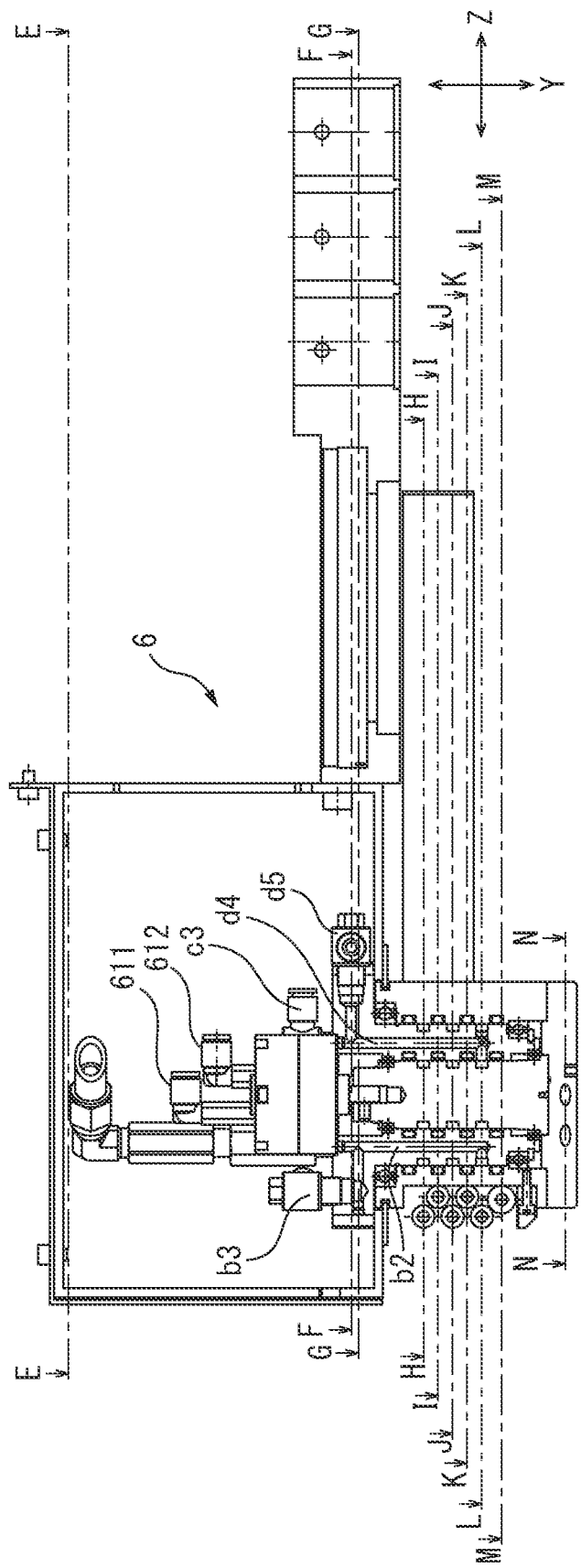
FIG. 15A is a cross-sectional view taken along line D-D shown in FIG. 3C.
Figure 15B:
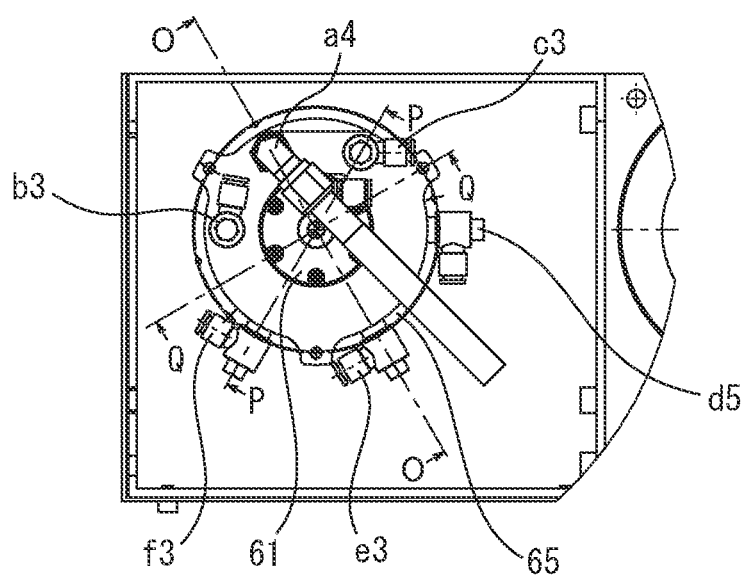
FIG. 15B is a sectional view taken along the line E-E shown in FIG. 15A.
Figure 15C:
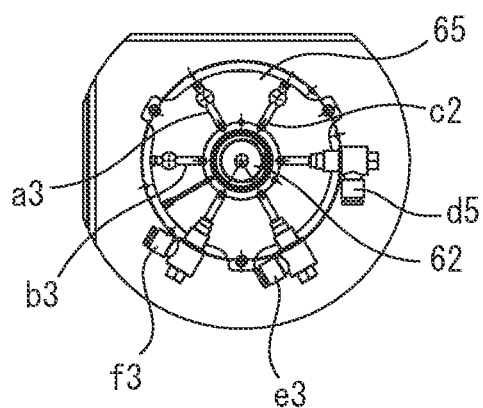
FIG. 15C is a cross-sectional view taken along the F-F shown in FIG. 15A.
Figure 15D:
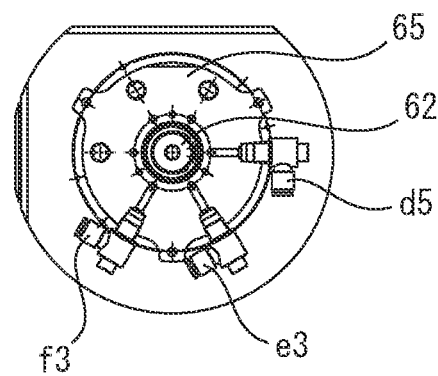
FIG. 15D is a cross-sectional view taken along the G-G line shown in FIG. 15A.
Figure 17B:
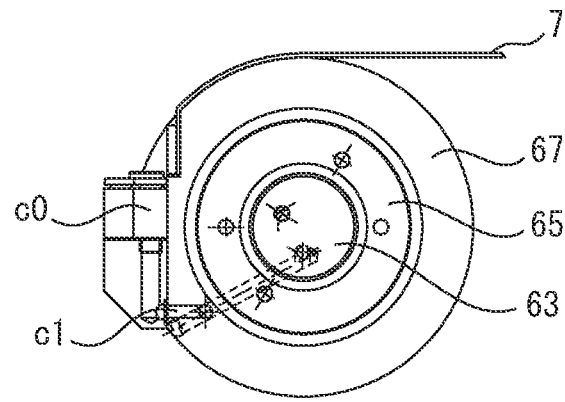
FIG. 17B is a sectional view taken along the line I-I shown in FIG. 15A.
Figure 17C:
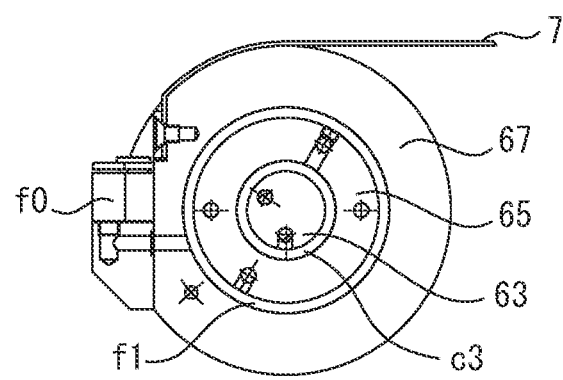
FIG. 17C is a cross-sectional view taken along the J-J shown in FIG. 15A.
Figure 17D:
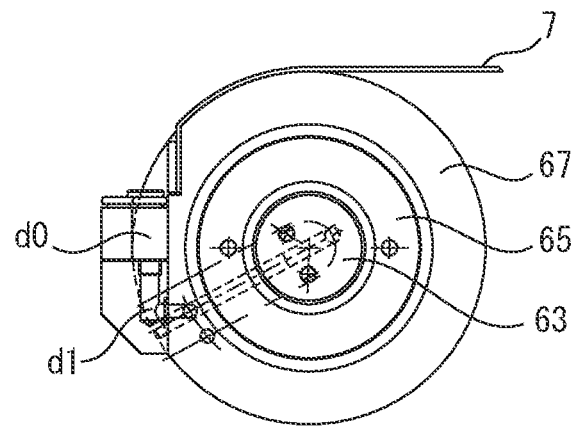
FIG. 17D is a cross-sectional view taken along K-K shown in FIG. 15A.
Figure 17E:
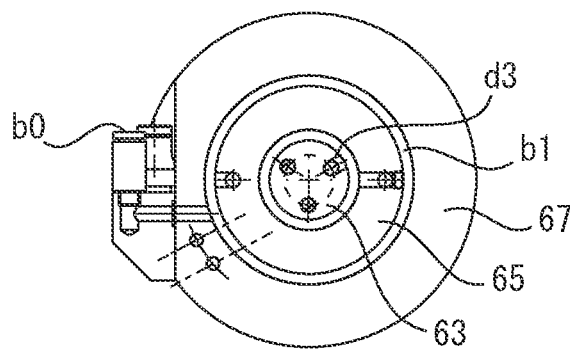
FIG. 17E is a cross-sectional view taken along line L-L shown in FIG. 15A.
Figure 17F:
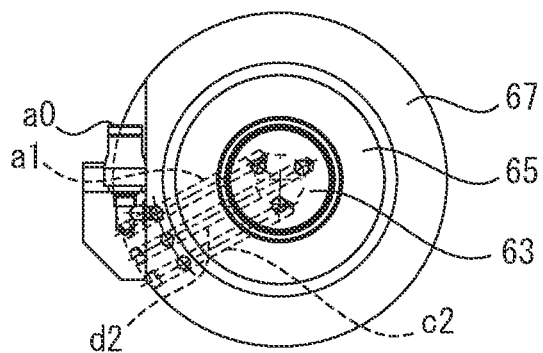
FIG. 17F is a sectional view taken along the line M-M shown in FIG. 15A.

In the second air port b0, when the tool holder 3 rotates to the second stop position, compressed air is supplied to the tool holder 3 via the second air port B0 via a 21th air pipe b1 shown in FIG. 17E, a 22th air pipe b2 shown in FIG. 15A, and a 23th air pipe b3.

Figure 17G:
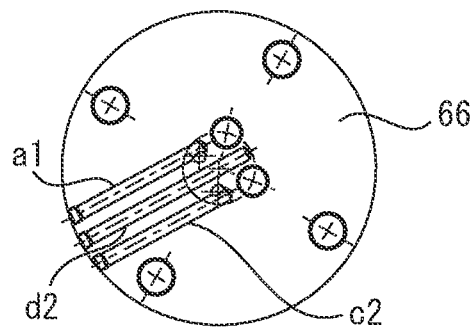
FIG. 17G is a cross-sectional view taken along the N-N shown in FIG. 15A.

When the tool holder 3 rotates to the second stop position, compressed air is supplied to the third air port c0. In the third air port c0, compressed air supplied via a 31th air pipe c1 shown in FIG. 17B, a 32th air pipe c2 shown in FIG. 17G, a 33th air pipe c3 shown in FIG. 17C, a 34th air pipe c4 and a 35th air pipe c5 shown in FIG. 16B is supplied to the tool holder 3 via the third air port CO.

When the tool holder 3 rotates to the second stop position, compressed air is supplied to the fourth air port d0. In the fourth air port d0, compressed air supplied via a 41th air pipe d1 shown in FIG. 17D, a 42th air pipe d2 shown in FIG. 17G, a 43th air pipe d3 shown in FIG. 17E, a 44th air pipe d4 shown in FIG. 15A, and a 45th air pipe d5 is supplied to the tool holder 3 via the fourth air port DO.

In the fifth air port e0, when the tool holder 3 rotates to the second stop position, compressed air is supplied to the tool holder 3 via the fifth air port E0 via a 51th air pipe e1 shown in FIG. 17A, a 52th air pipe e2 shown in FIG. 16A, and a 53th air pipe e3.

In the sixth air port f0, when the tool holder 3 rotates to the second stop position, the compressed air supplied via a 61th air pipe f1 shown in FIG. 17C, through a 62th air pipe f2, 63th air pipe f3 shown in FIG. 16B is supplied to the tool holder 3 via the sixth air port FO.

Figure 19A:
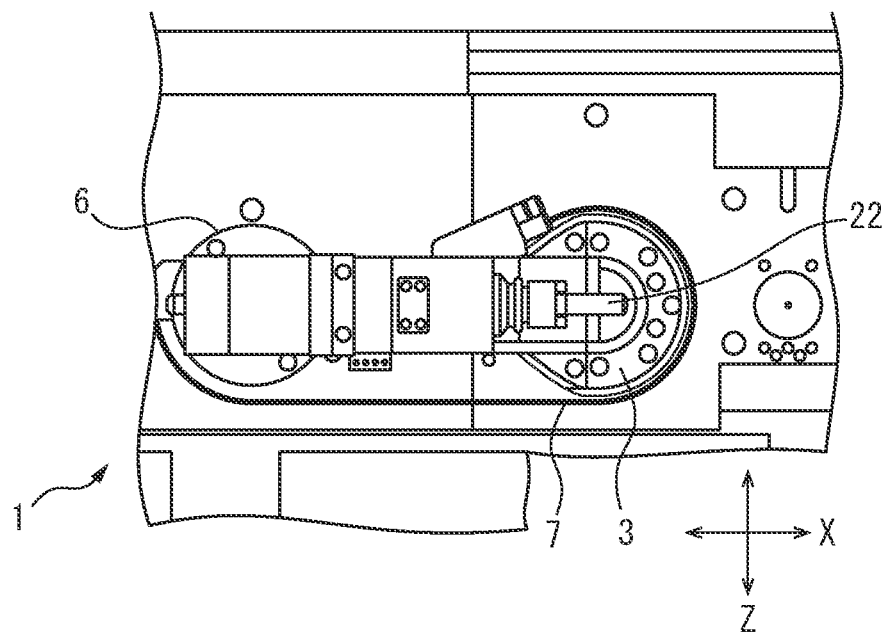
FIG. 19A is a diagram showing a state in which the rotating position of the tool holder shown in FIG. 1 is in a first stop position.
Figure 19B:
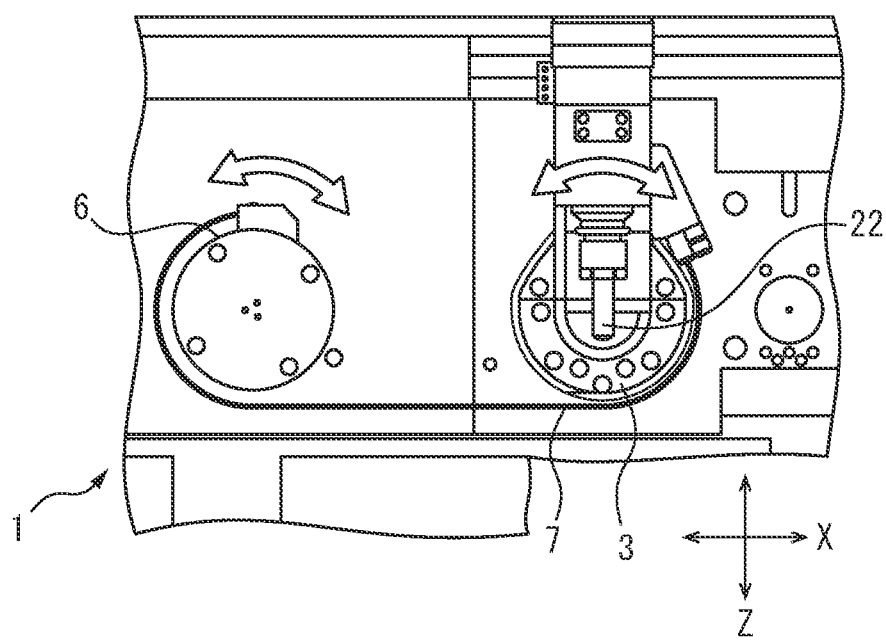
FIG. 19B is a diagram showing a state in which the rotating position of the tool holder shown in FIG. 1 is rotated 90 degree from the first stop position.
Figure 19C:
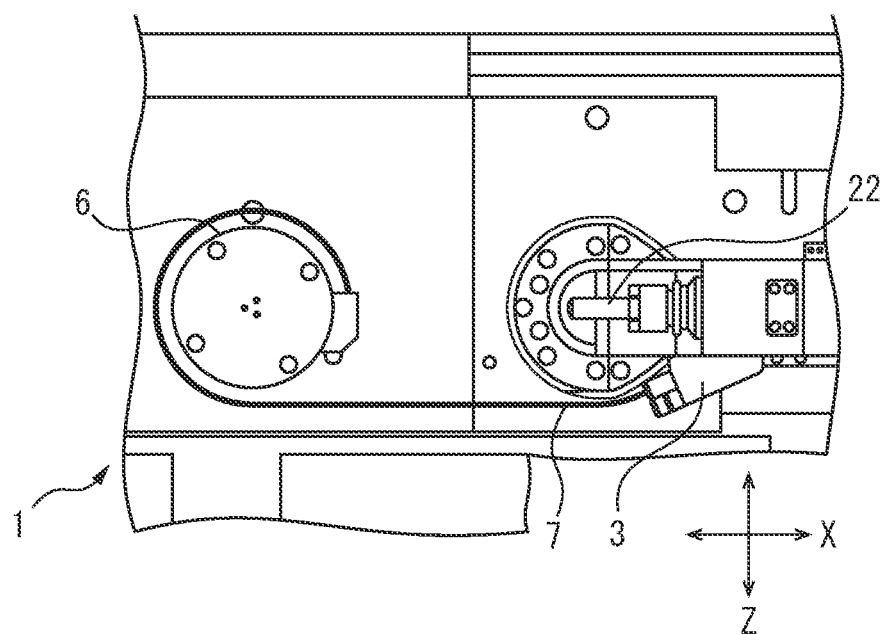
FIG. 19C is a second stop position rotated 180 degree from the first stop position of the tool holder shown in FIG. 1.

Referring to FIGS. 19A-19C, the control process of the tool holder 3 and winding device 6 by the NC device will be explained. First, the NC device moves the tool holder 3 and winding device 6 to the first stop position shown in FIG. 19A by controlling the rotational mechanism 4. In the first stop position, the cutting edges of the first rotary tool 21 and second rotary tool 22 held by the tool holder 3 are arranged so as to extend in the X-axis direction toward the main shaft 11 side. Then, the NC device moves the tool holder 3 in the X-axis direction, and therefore the workpiece gripped by the main shaft 11 is processed by the first rotary tool 21, the second rotary tool 22 and other installed tools.

When the second rotary tool 22 is replaced, the NC device moves the tool holder 3 in the −X axis direction away from the main shaft, and moves the tool holder 3 and winding device 6 from the first stop position to the second stop position by controlling the rotational mechanism 4. In response to rotation of the rotational mechanism 4, the tool holder 3 and the winding device 6 rotates 90 degree from the first stop position so as to synchronize at substantially the same rotational speed and the rotational phase, and rotate to the second stop position shown in FIG. 19C, after rotating to the position shown in FIG. 19B. In the second stop position, the cutting edges of the first rotary tool 21 and second rotary tool 22 held by the tool holder 3 are arranged so as to face the automatic tool changer side.

Then, the NC device makes the tool holder 3 and the automatic tool changer 13 move close to each other, and supplies compressed air from the compressor to the tool holder 3 via a predetermined air pipes 5. When each configuration required for tool change is actuated by the supplied compressed air, the second rotary tool 22 is removed from the tool holder 3, and another rotary tool housed in the automatic tool changer 13 is mounted on the tool holder 3. When the replacement of the second rotary tool 22 is completed, the NC device rotates the tool holder 3 and winding device 6 from the second stop position shown in FIG. 19C to −90 degree to the first stop position shown in FIG. 19A after rotating to the position shown in FIG. 19B, by controlling the rotational mechanism 4.

(Effect of the Tool Rest According to the Embodiment)

Since the tool rest 1 rotates the winding device 6 in accordance with the rotation of the tool holder 3, and winds up a plurality of air pipes 5 by the applied rotational force, the length of a plurality of air pipes 5 may be a length corresponding to the rotation.

Further, in the tool rest 1, when the winding device 6 rotates in connection with the rotation of the tool holder 3, the winding device 6 may wind up air pipes in a simple configuration by the applied rotational force so as not slack, by connecting the air pipes to the rotating member 67 which rotates in accordance with the rotation of the tool holder 3.

Further, in the tool rest 1, since the winding device 6 may rotate between the first stop position and the second stop position rotates in connection with the rotation of the tool holder 3, and internal pipes connected with each of the plurality of air pipes is formed, the winding device 6 may wind up the air pipe in a compact configuration.

(Modification of the Tool Rest According to the Embodiment)

Although, in the tool rest 1, the winding device 6 is connected by a plurality of air pipes 5 between the tool holder 3 and the winding device 6, in a tool rest according to the embodiment, a winding device may be connected with a tool holder and a winding device, by other linear members such as electrical wiring.

Further, although, in the tool rest 1, the winding device 6 is connected by a plurality of air pipes 5 and the auxiliary band 7 between the tool holder 3 and the winding device 6, in a tool rest according to the embodiment, a winding device may be connected by only a plurality of air pipes 5, without placing the auxiliary band 7.

While the embodiments have been described above, all examples and conditions described herein have been described for the purpose of helping to understand the concepts of the invention and the inventions to be applied to the art. The examples and conditions described in particular are not intended to limit the scope of the invention, and the configuration of such examples in the specification does not illustrate the advantages and disadvantages of the invention. Although the embodiments of the invention have been described in detail, it should be understood that various changes, replacements, and deforms can be made without departing from the spirit and scope of the invention.

What is claimed is:

1. A tool rest comprising:
   a base;
   a tool holder supported on the base, and configured to hold a tool;
   a rotational mechanism configured to rotate the tool holder;
   a plurality of flexible linear members in which a respective first end of each of the plurality of linear members is connected with the tool holder; and a winding device connected with a respective second end of each of the plurality of linear members, the winding device being configured to rotate for winding up the plurality of linear members when the tool holder is rotated by the rotational mechanism,
wherein the winding device comprises a shaft member and a rotator,
wherein the shaft member is rotatably supported on the base; and the rotator is connected with the shaft member and with the respective second end of each of the plurality of linear members, the rotator being configured to rotate with the shaft member when the tool holder rotates;
the plurality of flexible linear members includes a plurality of fluid pipes applying a fluid for controlling mounting and removal of the tool to the tool holder, and
internal pipes are formed in the winding device, wherein each of the internal pipes is connected with each of the plurality of fluid pipes.

2. The tool rest according to claim 1,
wherein the winding device further comprises: a shaft supporter arranged along an outer periphery of the shaft member, and fixed on the base; and a disk jointed to an end of the shaft member; and
wherein the rotator joins to an outer edge of the disk.

3. The tool rest according to claim 1, wherein the tool holder rotates between a first stop position and a second stop position by rotating 180 degrees.

4. The tool rest according to claim 1, wherein the plurality of linear members includes an auxiliary band arranged in parallel to the plurality of fluid pipes.

5. A machine tool comprising:
a main shaft rotatably holding a workpiece; and
the tool rest according to claim 1, the tool rest holding a tool for cutting the workpiece.

* * * * *